United States Patent
Yoshida et al.

(10) Patent No.: US 10,209,547 B2
(45) Date of Patent: Feb. 19, 2019

(54) APPARATUS HAVING CURABLE RESIN ADHERING PLATE-SHAPED BASE AND COVER PLATE AND MANUFACTURING METHOD THE SAME

(71) Applicant: NLT TECHNOLOGIES, LTD., Kawasaki, Kanagawa (JP)

(72) Inventors: Hitoshi Yoshida, Kanagawa (JP); Futoshi Nakanishi, Kanagawa (JP); Akira Fujita, Kanagawa (JP)

(73) Assignee: NLT TECHNOLOGIES, LTD., Kawasaki, Kanagawa (JP)

( * ) Notice: Subject to any disclaimer, the term of this patent is extended or adjusted under 35 U.S.C. 154(b) by 0 days.

(21) Appl. No.: 14/734,648

(22) Filed: Jun. 9, 2015

(65) Prior Publication Data

US 2015/0355498 A1 Dec. 10, 2015

(30) Foreign Application Priority Data

Jun. 10, 2014 (JP) ................................. 2014-119966

(51) Int. Cl.
*G02F 1/1333* (2006.01)
*G02F 1/1335* (2006.01)
(Continued)

(52) U.S. Cl.
CPC ........ *G02F 1/133308* (2013.01); *B32B 37/12* (2013.01); *G02F 1/133512* (2013.01);
(Continued)

(58) Field of Classification Search
CPC ................. G02F 2202/28; G02F 2001/133331
See application file for complete search history.

(56) References Cited

U.S. PATENT DOCUMENTS

2002/0021386 A1 2/2002 Yotsuya et al.
2009/0162645 A1 6/2009 Matsuhira
(Continued)

FOREIGN PATENT DOCUMENTS

JP 2001-188107 A 7/2001
JP 2009-192792 A 8/2009
(Continued)

OTHER PUBLICATIONS

Communication dated Mar. 13, 2018 from the Japanese Patent Office in counterpart Application No. 2014-119966.
Communication dated Oct. 30, 2018 from the Japanese Patent Office in counterpart Application No. 2014-119966.

*Primary Examiner* — Lauren Nguyen
(74) *Attorney, Agent, or Firm* — Sughrue Mion, PLLC

(57) ABSTRACT

There are provided an apparatus and a method of manufacturing the apparatus. The apparatus includes: a plate-shaped base; a cover plate; and a curable resin adhering the plate-shaped base and the cover plate together. At least one of the plate-shaped base and the cover plate includes a light-shielding member covering a peripheral part of the at least one of the plate-shaped base and the cover plate. In an area which is shielded by the light-shielding member, a part of the curable resin at a side of an inner edge of the light shielding member is lower in one of an elastic modulus, a curing degree, and an adhesion strength than another part of the curable resin at a side of an outer edge of the light shielding member.

15 Claims, 22 Drawing Sheets

(51) Int. Cl.
  *G02F 7/00* (2006.01)
  *B32B 37/12* (2006.01)
  *B32B 37/18* (2006.01)
  *B32B 38/00* (2006.01)
  *B32B 43/00* (2006.01)

(52) U.S. Cl.
  CPC ........... *B32B 37/18* (2013.01); *B32B 38/0008* (2013.01); *B32B 2037/1253* (2013.01); *B32B 2038/0076* (2013.01); *B32B 2307/41* (2013.01); *B32B 2457/202* (2013.01); *G02F 2001/133331* (2013.01); *G02F 2202/28* (2013.01); *Y10T 156/10* (2015.01)

(56) References Cited

U.S. PATENT DOCUMENTS

| | | | |
|---|---|---|---|
| 2010/0097552 A1* | 4/2010 | Shinya | C09J 109/00 349/122 |
| 2011/0205472 A1 | 8/2011 | Kobayashi et al. | |
| 2012/0235048 A1* | 9/2012 | Kim | G02F 1/133308 250/372 |

FOREIGN PATENT DOCUMENTS

| | | |
|---|---|---|
| JP | 2011-170169 A | 9/2011 |
| JP | 2013-88455 A | 5/2013 |
| WO | 2007/066590 A1 | 6/2007 |

\* cited by examiner

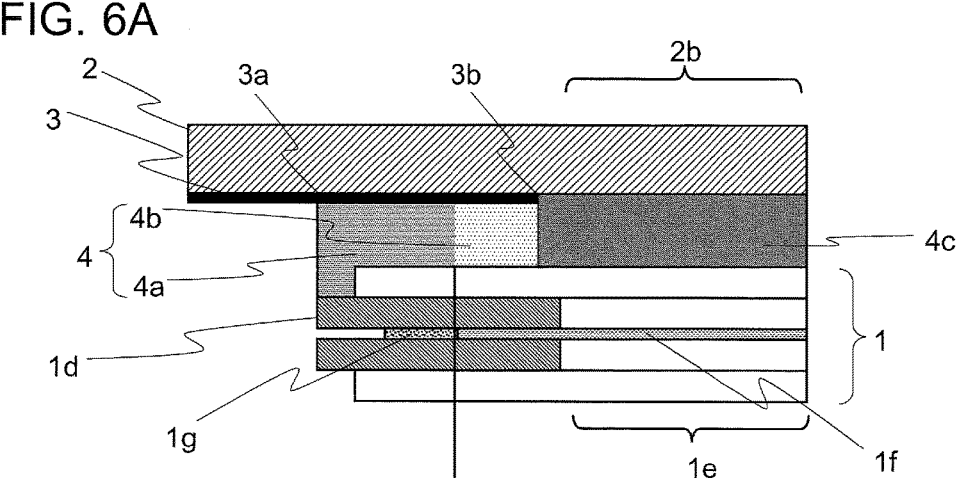
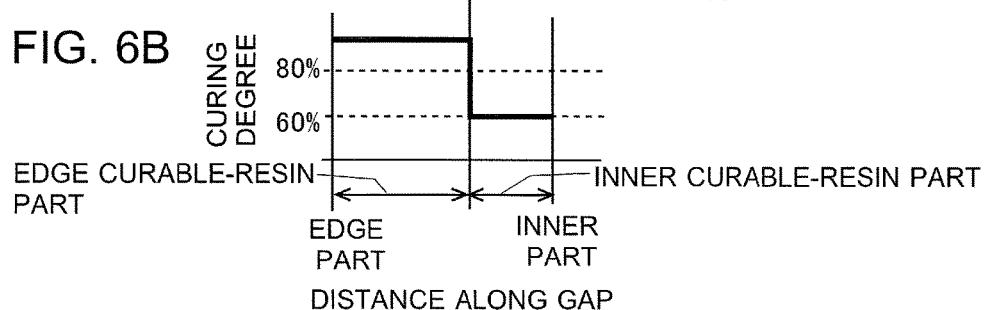

US 10,209,547 B2

APPARATUS HAVING CURABLE RESIN ADHERING PLATE-SHAPED BASE AND COVER PLATE AND MANUFACTURING METHOD THE SAME

TECHNICAL FIELD

The present invention relates to an apparatus and a manufacturing method of the same. Particularly, the present invention relates to an apparatus having a structure in which a transparent cover plate and a base, such as a display unit and a touch sensor, are adhered together with curable resin, and a manufacturing method of the same.

BACKGROUND

In mobile phones, smart phones, touch panels and other devices, which are equipped with an image display section, the image display section have conventionally employed the following structure (an air gap structure). That is, an air gap is made between an image display unit, such as a liquid crystal display module, and a transparent cover plate put on top of the image display unit (e.g., a glass plate, a tempered-glass plate, an acrylic board, a PET or polyethylene terephthalate board, and a composite substrate including any of them). Such a structure avoids separation of the cover plate from the image display unit, which can be occurs because of separation force applied to the cover plate due to external stress, and avoids display defects due to external force being applied to the display unit.

In recent years, for the purpose of improving visibility and adhesion of the display unit, a part of such devices employs a structure that a cover plate and the display unit is adhered with optical elasticity resin which can be cured by light. In apparatuses which are desired to have enhanced design characteristics and enhanced decoration characteristics of the display unit (e.g., a car navigation system and a tablet terminal), a cover plate decorated by printing is used, and the screen size for those apparatuses tends to become larger.

FIG. 24 illustrates a conventional display apparatus disclosed in International Patent Application Publication WO2007/066590 (corresponding to US2009/162645A1). The conventional display apparatus includes: a transparent cover plate 21; a light-shielding printed member 22 prepared by printing with black ink and arranged on the rear surface of the transparent cover plate 21 around the periphery of a display area of the transparent cover plate 21; a display unit including a TFT (Thin Film Transistor) substrate 23, a CF (Color Filter) substrate 24, a phase difference correction film 25, a polarization plate/optical film 26, and a driver IC 27; and a transparent photo-curable resin 28 that bonds the transparent cover plate 21 and the entire surface of the display unit together.

The thickness of the photo-curable resin 28 is in the range of 30 μm to 200 μm and the protrusion of the photo-curable resin 28 from the outer periphery of the display unit is within about 0.3 mm. The part sandwiched by the light-shielding printed member 22 and the display unit is not irradiated with light coming from upward of the cover plate or downward of the display unit. Therefore, light is irradiated from a lateral direction of the outer circumference of the cover plate so as to cure the photo-curable resin 28 to have the curing degree of 70% or more.

FIG. 25 illustrates a structure of a conventional display apparatus disclosed in Japanese Unexamined Patent Application Publication (JP-A) No. 2013-088455. The conventional display apparatus includes: a transparent cover plate 31; a light-shielding printed member 32 prepared by printing with black ink and arranged on the rear surface of the transparent cover plate 31 around the periphery of a display area of the transparent cover plate 31; a display unit including a flat panel display unit 33, a backlight 34 and a bezel 35; a dam section arranged on an outer-edge area of the transparent cover plate 31; and a transparent photo-curable resin 37 that adheres the transparent cover plate 31 and the entire surface of the display unit together.

The dam section 36 is formed by applying photo-curable material onto the transparent cover plate 31 in advance to form a bead shape having height of 150 μm and width of 1 mm and then curing the photo-curable material by light. A predetermined amount of photo-curable resin 37 is applied on the inner side of the dam section 36 so as to have the thickness of 150 μm, the transparent cover plate 31 is joined together with the display unit, and the photo-curable resin 37 is fully cured by irradiation of UV light or the like.

In WO2007/066590, the photo-curable resin 28 on a location sandwiched by the light-shielding printed member 22 on the transparent cover plate 21 and the display unit has a uniform curing degree not less than 70%. In addition, in JP-A No. 2013-088455, the photo-curable resin 37 has a uniform curing degree and is fully cured.

In WO2007/066590 and JP-A No. 2013-088455, photo-curable resin on a location sandwiched by the transparent cover plate and the display unit is cured to have a uniform high curing degree. Accordingly, when the transparent cover plate is deformed by external force, such a deformation makes the stress applied to the display area to cause display defect. In addition, under the condition that the photo-curable resin is cured with a uniform curing degree to have a low curing degree, such a condition can make a problem that external force can separate the transparent cover plate from the display unit.

In addition, the dam section 36 is provided to avoid the photo-curable resin 37 from flowing outside the display unit and therefore the resin does not reach to the end of the display unit in JP-A No. 2013-088455. Thus, there are issues of the transparent cover plate 31 is easily separated from the display unit as a result of external force from the end of the transparent cover plate 31. Such a condition can make a problem that external force applied from the end of the transparent cover plate 31 can easily remove the transparent cover plate from the display unit.

The present invention seeks to solve the problems.

SUMMARY

In view of the above-mentioned problems, there are provided illustrative apparatuses and illustrative manufacturing methods of such an apparatus, as embodiments of the present invention. The illustrative apparatus can be a display apparatus, and avoids occurrence of display defects due to external force and further avoids a cover plate from being separated from the display unit.

The present invention is directed to an apparatus comprising: a plate-shaped base; a cover plate; a curable resin located in a gap between the plate-shaped base and the cover plate and adhering the plate-shaped base and the cover plate together; and a light-shielding member located on a peripheral part of at least one of the plate-shaped base and the cover plate. The curable resin includes a first curable-resin part, a second curable-resin part, and a third curable-resin part. In an area in the gap, which is shielded by the light-shielding member, the first curable-resin part is located at a side of an outer edge of the light-shielding member and the second curable-resin part is located at a side of an inner edge of the light-shielding member. In an inner area in the gap, which is surrounded by the light-shielding member, the third curable-resin part is located. The second-curable resin part is lower in one of an elastic modulus, a curing degree, and an adhesion strength than the first-curable resin part.

The present invention is directed to a method of manufacturing an apparatus including a plate-shaped base, a cover plate, a curable resin adhering the plate-shaped base and the cover plate together, and a light-shielding member located on a peripheral part of at least one of the plate-shaped base and the cover plate. The method comprises: adhering the plate-shaped base and the cover plate together, by applying the curable resin onto at least one of the plate-shaped base and the cover plate, and adjusting positions of the plate-shaped base and the cover plate; curing the curable resin in an entire of an area, which is shielded by the light-shielding member, in a gap between the plate-shaped base and the cover plate; and curing the curable resin only in an outer-edge part of the area, which is shielded by the light-shielding member, in the gap. After both of the curing the curable resin in the entire of the area in the gap and the curing the curable resin only in the outer-edge part of the area in the gap, the curable resin in an inner-edge part of the area in the gap is lower in one of an elastic modulus, a curing degree, and an adhesion strength than the curable resin in the outer-edge part of the area in the gap.

Other features of illustrative embodiments will be described below.

BRIEF DESCRIPTION OF THE DRAWINGS

Embodiments will now be described, by way of example only, with reference to the accompanying drawings which are meant to be exemplary, not limiting, and wherein like elements numbered alike in several figures, in which:

FIG. 6A and FIG. 6B depict a half sectional view of another example of a display apparatus (having a structure that photo-curable resin in the gap having the increased curing degree up to a position of the outer edge of the seal) of Example 1 and a graph of the curing degree;

DETAILED DESCRIPTION

Figure 1A:
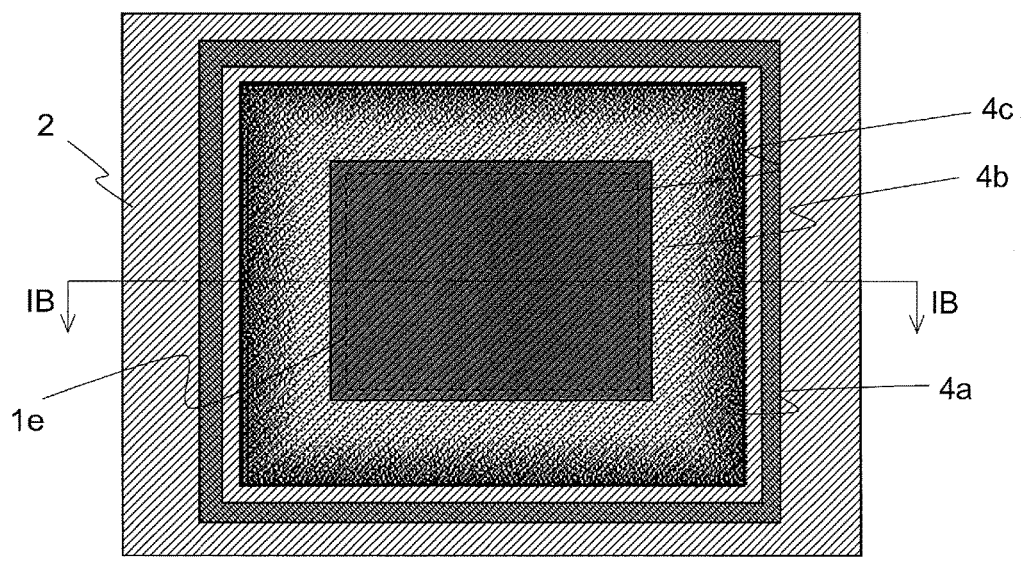
FIG. 1A and FIG. 1B depict a plan view and a sectional view illustrating an example of a display apparatus (having a structure using a liquid crystal panel for the base) of Example 1.

Illustrative apparatuses and illustrative manufacturing methods of such an apparatus will be described below as embodiments of the present invention with reference to the drawings. It will be appreciated by those of ordinary skill in the art that the description given herein with respect to those figures is for exemplary purposes only and is not intended in any way to limit the scope of potential embodiments may be resolved by referring to the appended claims.

According to illustrative apparatuses and illustrative manufacturing methods as embodiments of the present invention, there can be provided a display apparatus in which the entire surface of a base including an image display region is adhered to a cover plate including a light-shielding member by using curable resin. The display apparatus can avoid separation of the cover plate from the base because of external force. Further, the display apparatus can reduce the stress, which comes from deformation of the cover plate due to external force, applied to the display region, and reduce display defects.

As described in the background, there have been provided apparatuses employing a structure that a cover plate and a display unit is adhered together with optical elasticity resin which can be cured by light. In conventional structures, photo-curable resin is cured to have a uniform and high curing degree. In such structures, deformation of a cover plate due to external force can cause the stress to be applied to a display region and then cause display defects in the display region. On the other hand, in a structure that a photo-curable resin is cured to have a uniform and low curing degree, such a structure can cause separation of the cover plate from the base because of external force, which is a problem. In another structure using dam section 36 to prevent photo-curable resin 37 from spilling out, as disclosed in JP-A No. 2013-088455, such a structure can easily cause separation of a cover plate from a display unit because of external force applied from the edge of the cover plate, which is also a problem.

In view of the problems, as one embodiment of the present invention, there is provided an apparatus including a plate-shaped base; a cover plate; a curable resin adhering the base and the cover plate together; and a light-shielding member covering a peripheral part of at least one of the plate-shaped base and the cover plate. The curable resin has been cured to include a first curable-resin part, a second curable-resin part, and a third curable-resin part. In an area in the gap, which is shielded by the light-shielding member, the first curable-resin part is located at a side of an outer edge of the light-shielding member and the second curable-resin part is located at a side of an inner edge of the light-shielding member. In an inner area in the gap, which is surrounded by the light-shielding member, the third curable-resin part is located. The second-curable resin part is lower in one of an elastic modulus, a curing degree, and an adhesion strength than the first-curable resin part.

As a concrete example of the above embodiment, there is provided an apparatus, such as a display apparatus, including a cover plate having a light-shielding member; a base having a display region; and curable resin put between the cover plate and the base to adhere the entire surface of the base onto the cover plate. In the apparatus, the curable resin is cured not to have a uniform and high curing degree but is cured such that a part of the curable resin located between the light-shielding member on the cover plate and the display unit, is in a non-fluid state in the vicinity of the inner edge of the light-shielding member (in an inner curable-resin part), and to have the lower curing degree in the vicinity of the inner edge of the light-shielding member (in an inner curable-resin part) in comparison with the curing degree at the side of the outer edge of the light-shielding member (in an edge curable-resin part). Such a structure reduces the stress to be applied to the display region, which coming from a deformation of the cover plate due to eternal force, and reduces display defects to be caused in the display region. Further, such a structure further restricts separation of the cover plate from the display unit because of external force. Hereafter, such apparatuses and manufacturing methods will be described in detail with reference to the drawings.

Example 1

First, an apparatus and a manufacturing method of the apparatus according to Example 1 will be described with reference to FIGS. 1A to 16D. The present example provides an example that the structure of the above-described embodiment is applied to the following display apparatus. The display apparatus includes a base which uses liquid crystal panel 1 for an image display region; cover plate 2 including light-shielding member 3; and curable resin 4 which is photo-curable resin. The entire surface of the base is adhered to the cover plate 2 with the photo-curable resin 4. Hereinafter, the structure of Example 1 will be described with reference to FIGS. 1A to 2B.

Figure 1B:
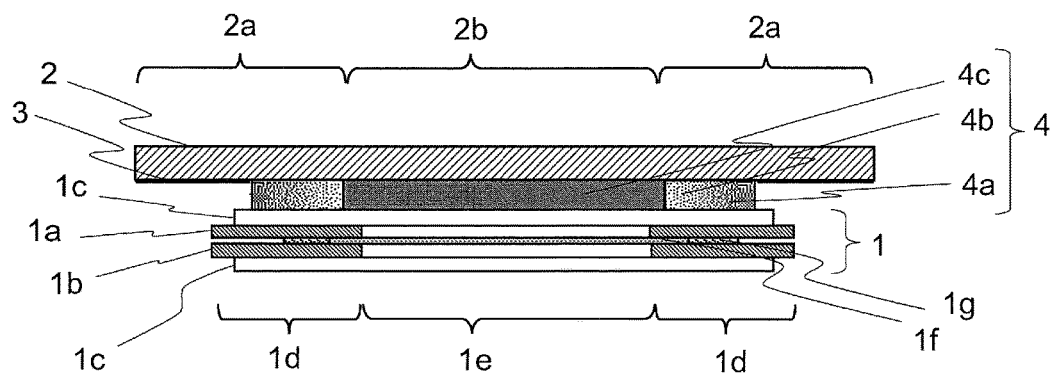
Figure 2A:
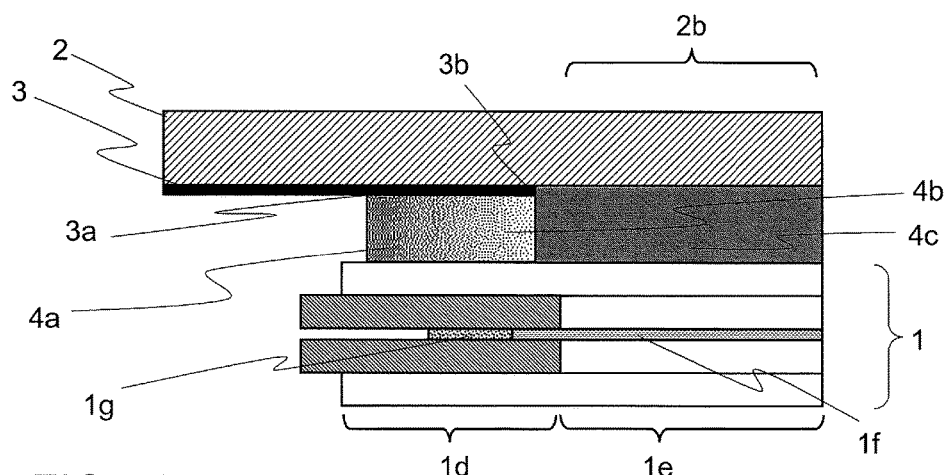
FIG. 2A and FIG. 2B depict a half sectional view illustrating an example of a display apparatus (having a structure using a liquid crystal panel for the base) of Example 1 and a graph of the curing degree.
Figure 2B:
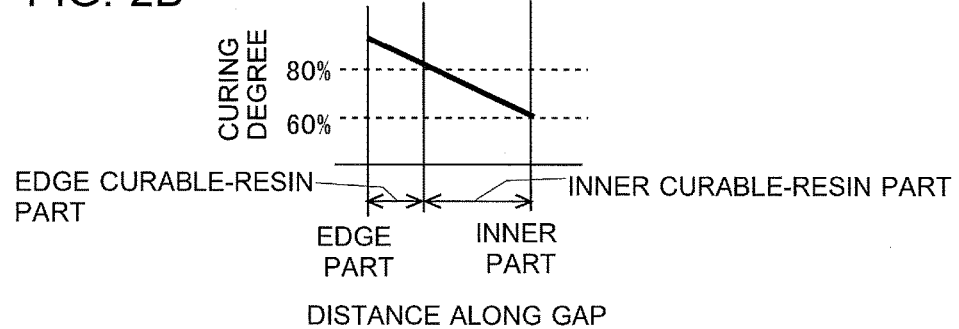

FIG. 1A is a plan view of the display apparatus, and FIG. 1B is a sectional view of the display apparatus, taken along the line IB-IB in FIG. 1A. FIG. 2A and FIG. 2B are a half sectional view of the display apparatus and a graph of an example of the curing degree of the curable resin with respect to distance along a gap between the base and the cover plate 2.

The base can be an image display device, such as a flat panel display, a liquid crystal display unit, a liquid crystal panel, and an LCD (Liquid Crystal Display) module. A liquid crystal panel is used for the base in this example.

The base is liquid crystal panel 1 including display region 1$e$ for displaying images; and wiring region 1$d$ surrounding the display region 1$e$, for supplying display signals. The display region 1$e$ includes TFT elements, RGB pixels (red, green, and blue pixels) and a BM (black matrix) pattern which are formed thereon, and displays images on the basis of the display signals. The wiring region 1$d$ includes wiring for supplying display signals to the TFT elements. Since the wiring is formed using a metallic film or the like, it does not transmit light. The wiring region 1$d$ further includes a light-shielding film for blocking light coming from a backlight.

The liquid crystal panel 1 as the base includes TFT substrate 1$b$, color-filter substrate 1$a$, seal 1$g$, liquid crystal 1$f$, and polarization plates and optical compensation films 1c. On the TFT substrate 1b, TFT elements and other elements are patterned. On the color-filter substrate 1a, RGB pixels, a black matrix pattern and other elements are patterned. The seal 1g joins the TFT substrate 1b and the color-filter substrate together and makes an arbitrary space inside itself. The liquid crystal 1f fills a gap between the TFT substrate 1b and color-filter substrate 1a (in other words, is sealed in the space inside the seal 1g). The polarization plates and optical compensation films 1c are adhered on the top surface and the rear surface of the joined substrates.

The cover plate 2, on which the light-shielding member 3 is arranged, can be a substrate made of transparent glass, a substrate made of tempered glass, a substrate made of plastics, such as an acrylic board and a PET board, and a composite substrate made of any of them. The cover plate 2 includes light-shielding region 2a and light-transmission region 2b. The light-transmission region 2b is a part of the cover plate 2, corresponding to the display region 1e of the base, under the condition that the cover plate 2 and the base are adhered together. In the other part of the cover plate 2, there is arranged the light-shielding member 3 made of black ink with light-blocking effect to cover the outer edge part (peripheral part) of the cover plate 2, and the light-shielding member 3 shields the outer edge part from light to form the light-shielding region 2a having a belt-like shape. It should be noted that the light-shielding member 3 of the present example is formed of black ink, but any material having light-blocking effect (e.g., color ink) or any surface treatment (e.g., forming a reflection film) can be used for forming the light-shielding member 3, alternatively.

Examples of the curable resin 4 used for adhering together the base and the cover plate 2 having the light-shielding member 3, include photo-curable resin, heat-curable resin, moisture-curable resin, and hybrid curable resin having plural types of curing function of, for example, photo-curable resin, heat-curable resin, and moisture-curable resin (photo-curability, heat-curability, and moisture-curability). Herein, photo-curable resin is used for describing the present example.

The photo-curable resin located in the gap between the cover plate 2 and the base is resin which can be cured (hardened) by light. The photo-curable resin includes an edge curable-resin part 4a located at the side of the outer edge of the light-shielding member 3 (a first curable-resin part); an inner curable resin part located at the side of the inner edge (in the vicinity of the inner edge) of the light-shielding member 3 (a second curable-resin part); and a curable resin part located within an area in the gap corresponding to in light-transmission region 2b inside the light-shielding member 3 (a third curable-resin part). The photo-curable resin is cured such that these curable resin parts have the curing degrees after a curing process, as follows. The curing degree, which is obtained after a curing process, of the inner curable-resin part 4b located nearby the display region 1e of the base and in the vicinity 3b (inner part) of the inner edge of the light-shielding member 3, differs from the curing degree, which is obtained after a curing process, of the edge curable-resin part 4a located a side 3a of the outer edge of the light-shielding member 3 (edge part). That is, the inner curable-resin part 4b is lower in curing degree after a curing process than the edge curable-resin part 4a. The method of curing the curable resin 4 in the gap will be given in the manufacturing method described later.

Figure 3A:
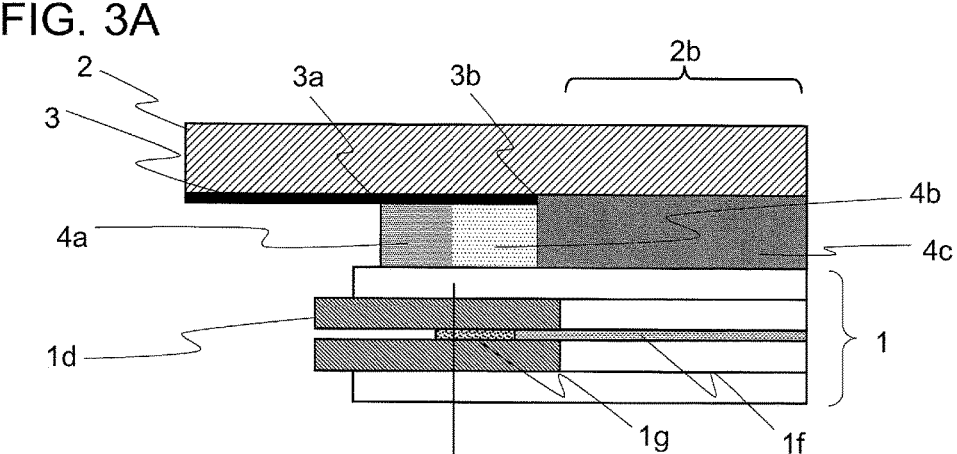
FIGS. 3A and 3B depict a half sectional view of another example of a display apparatus in which curable resin is in an ideal cured state, and a graph of the curing degree.
Figure 3B:
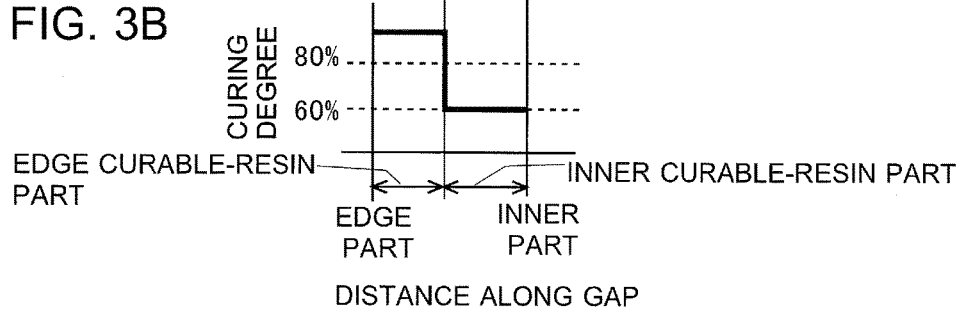

It is preferable that, as illustrated in FIGS. 2A and 2B, the curing degree after a curing process of the inner curable-resin part 4b located nearby the display region 1e of the base and in the vicinity 3b of the inner edge of the light-shielding member 3 is about 60%, which is in a non-fluidized cured state (the definition of "non-fluidized" will be described later), and the curing degree after a curing process of the edge curable-resin part 4a is equal to 80% or more, which is in a cured state. In the present example, the curing degree of the edge curable-resin part 4a and the inner curable-resin part 4b decreases continuously or gradually from the edge part to the inner part (from an end of the first curable-resin part at the side of the outer edge of the light-shielding member to an end of the second curable-resin part at the side of the inner edge of the light-shielding member), as illustrated in FIG. 2B, where the inner part represents a part of the curable resin in the vicinity 3b of the inner edge of the light-shielding member 3, and the edge part represents a part of the curable resin at the side 3a of the outer edge of the light-shielding member 3. The ideal cured state is that, as illustrated in FIGS. 3A and 3B, the curing degree of the edge curable-resin part 4a and the inner curable-resin part 4b changes step-wise from the edge part to the inner position.

Figure 4A:
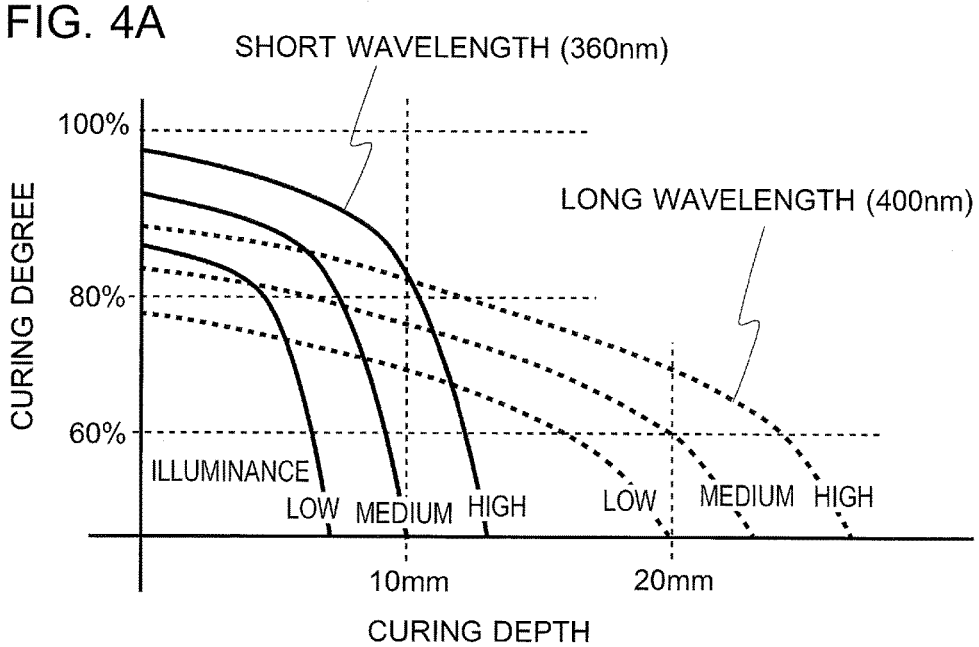
FIG. 4A depicts a graph illustrating an example of curing degree vs curing depth characteristics of the curing resin for various wavelengths of curing light and the integrated amount of irradiated light.
Figure 4B:
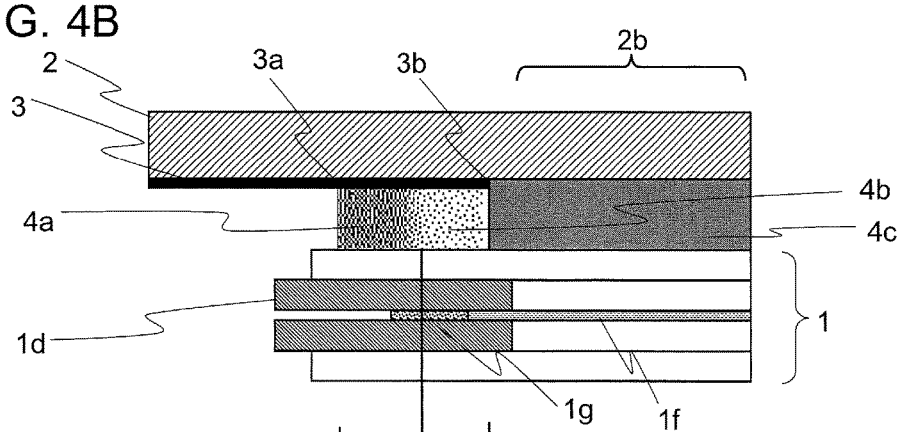
FIG. 4B and FIG. 4C depict a half sectional view of another example of a display apparatus (having a structure that the curing degree of curable resin in a gap changes step-wise) of Example 1 and a graph of the curing degree.
Figure 4C:
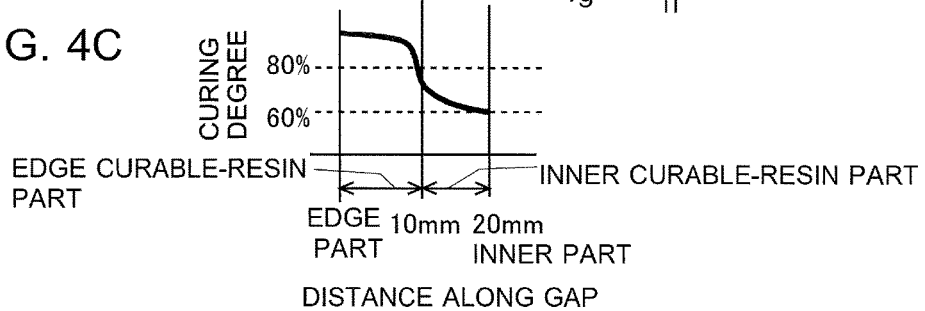

A step-wise profile of the curing degree can be obtained by preparing two or more kinds of UV rays having different wavelengths for a curing process and by selectively controlling the wavelength of the UV rays and the illuminance level of UV rays of the selected wavelengths. For example, it is considered a way to form a structure illustrated in FIGS. 4B and 4C such that the edge curable-resin part 4a extends to the length of 10 millimeters from the end of the curable resin 4 at the side 3a of the outer edge of the light-shielding member 3 and the inner curable-resin part 4b extends from the position 10 millimeters away from the end of the curable resin 4 to the position 20 mm from the end of the curable resin 4. In this structure, the step-wise profile of the curing degree as illustrated in FIG. 4C can be achieved by the following processes. In advance of curing processes, the curing conditions of the curable resin are confirmed for wavelengths of curing light and illuminance levels of curing light with each of the wavelengths, as illustrated in FIG. 4A. FIG. 4A shows an example of curing degree vs curing depth characteristics of the curing resin for short and long wavelengths of curing light and for HIGH, MIDDLE and LOW illuminance levels (the integrated amount of the irradiated light) of curing light with each of the wavelengths. On the basis of the confirmation result, the curable resin is irradiated with curing light with a long wavelength (for example, 400 nm), which is effective to cure the inner curable-resin part 4b, at the MEDIUM illuminance level, to form the inner curable-resin part 4b, and is further irradiated with light with a short wavelength (for example, 360 nm), which is effective to cure the edge curable-resin part 4a, at the HIGH illuminance level, to form the edge curable-resin part 4a.

Figure 5A:
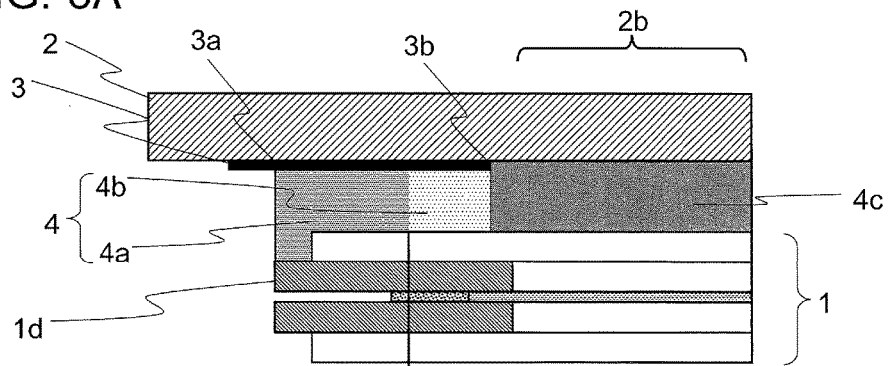
FIG. 5A and FIG. 5B depict a half sectional view of another example of a display apparatus (having a structure that the gap is filled with photo-curable resin up to the end of the base) of Example 1 and a graph of the curing degree.
Figure 5B:
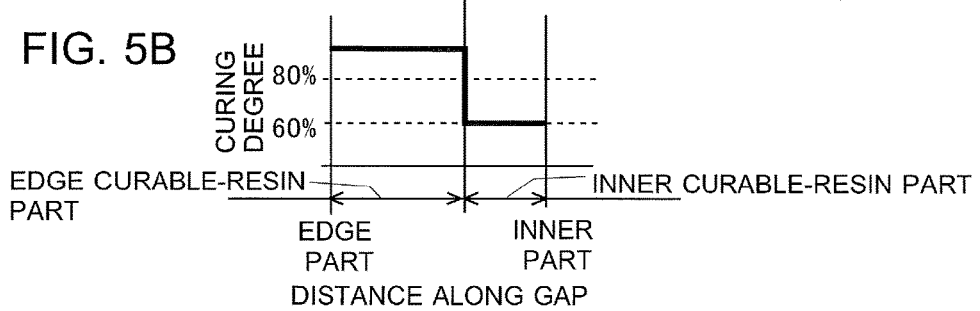

It should be noted that, as illustrated in FIGS. 5A and 5B, by filling the gap between the light-shielding member 3 on the cover plate 2 and the wiring region 1d of the base with photo-curable resin up to the end of the base, it is possible to restrict deterioration of the polarization plates and optical compensation films 1c adhered on the top surface and the rear surface of the liquid crystal panel 1 as the base.

Further, as illustrated in FIG. 5, even in the structure that the light-shielding member 3 on the cover plate 2 does not extend to the outer peripheral edge of the cover plate 2, but extends to the midway between the end of the transparent region 2b and the outer peripheral edge of the cover plate 2 so as to block light, it is possible to cure the curable resin 4 such that the curing degree after a curing process of the inner curable-resin part 4b is lower than that of the edge curable-resin part 4a.

In the liquid crystal panel 1, liquid crystal 1f fills a space partitioned by the seal 1g in the gap between the TFT substrate 1b and the color-filter substrate 1a, and the liquid crystal 1f is in a fluidized state. If external force is applied to the space filled with the liquid crystal 1f, such external force can easily vary the gap and cause display defects. In view of that, the second curable-resin part is located in the gap to cover an area from the inner edge of the light-shielding member 3 on the cover plate 2 to an inner edge of the seal, and the first curable-resin part is located in the gap to cover an area extending from the inner edge of the seal toward the outer edge of the light-shielding member 3 (to the end of the curable resin 4 at the side of the outer edge of the light-shielding member 3). In order to the external force, the inner curable-resin part 4b may have the lower curing degree after a curing process, in comparison with the curing degree of the other part of the curable resin 4 located in the gap of the light-shielding member 3 on the cover plate 2 and the wiring region 1d of the base, as illustrated in FIGS. 6A and 6B. Such a structure can avoid occurrence of display defects in the liquid crystal panel 1 as the base because of external force. It should be noted that the position to cure the curable resin such that the curing degree after a curing process of the edge curable-resin part 4a is higher than that of the inner curable-resin part 4b may be located in a part of the curable resin surrounding the display region 1e.

Figure 7A:
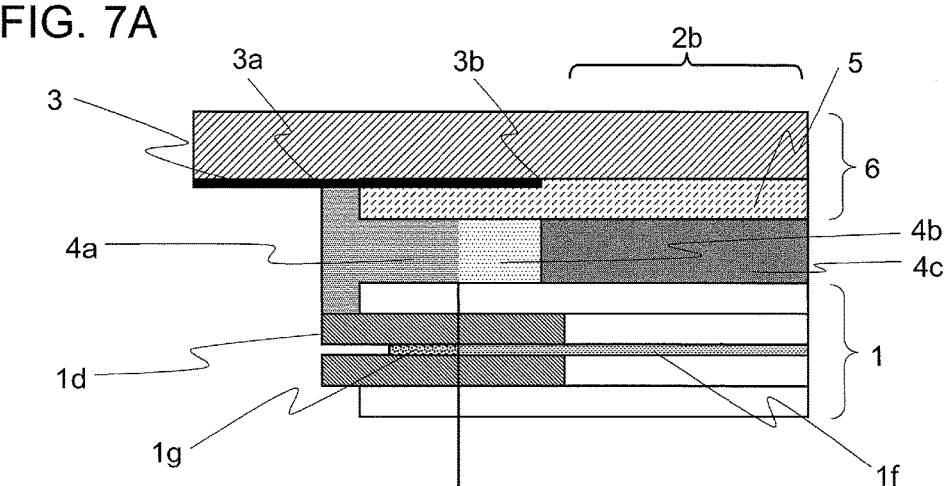
FIG. 7A and FIG. 7B depict a half sectional view of another example of a display apparatus (having a structure employing a cover panel with a touch sensor, for the cover panel) of Example 1 and a graph of the curing degree.
Figure 7B:
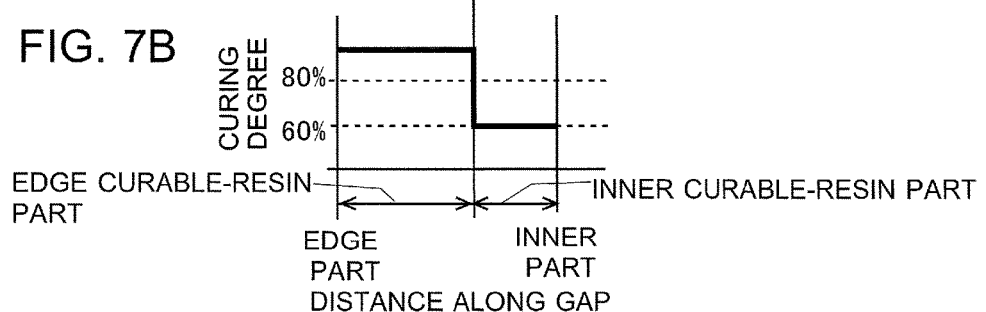
Figure 8A:
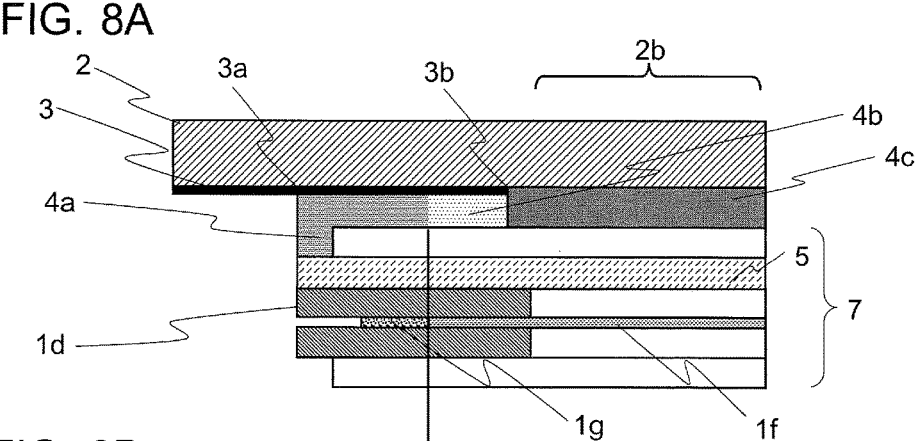
FIG. 8A and FIG. 8B depict a half sectional view of another example of a display apparatus (having a structure employing a liquid crystal panel with a touch sensor, for the base) of Example 1 and a graph of the curing degree.
Figure 8B:
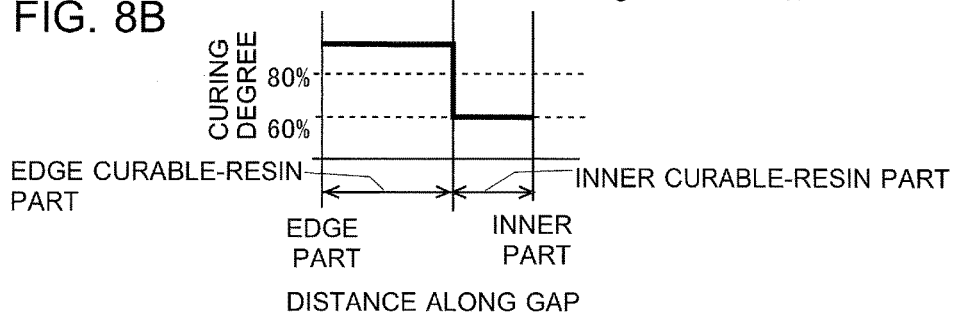

Although structures that liquid crystal panel 1 is used for the base and a plate with light-shielding member 3 is used for the cover plate 2 have been described above, there may be provided a structure that a substrate including touch sensor 5 is used for the base or the cover plate 2 so as to add an input function of a touch panel. For example, there can be provided a structure employing cover plate 6 with a touch sensor, prepared by adding touch sensor 5 onto a cover plate, as illustrated in FIGS. 7A and 7B, or a structure employing liquid crystal panel 7 with a touch sensor, prepared by adding touch sensor 5 onto a liquid crystal panel as the base, as illustrated in FIGS. 8A and 8B.

Figure 9A:
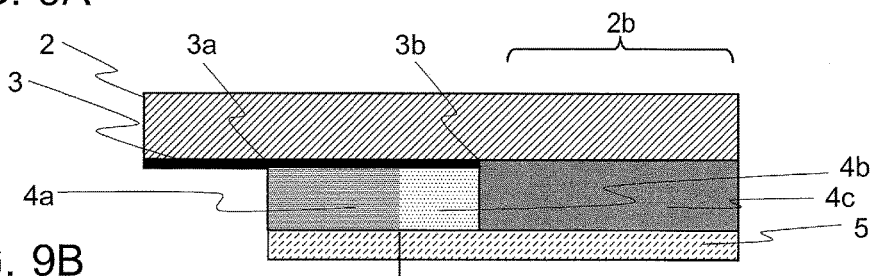
FIG. 9A and FIG. 9B depict a half sectional view of another example of a display apparatus (having a structure employing a transparent touch sensor, for the base) of Example 1 and a graph of the curing degree.
Figure 9B:
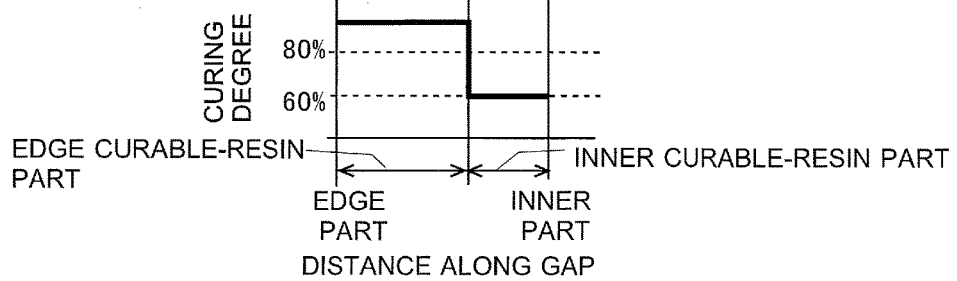
Figure 10A:
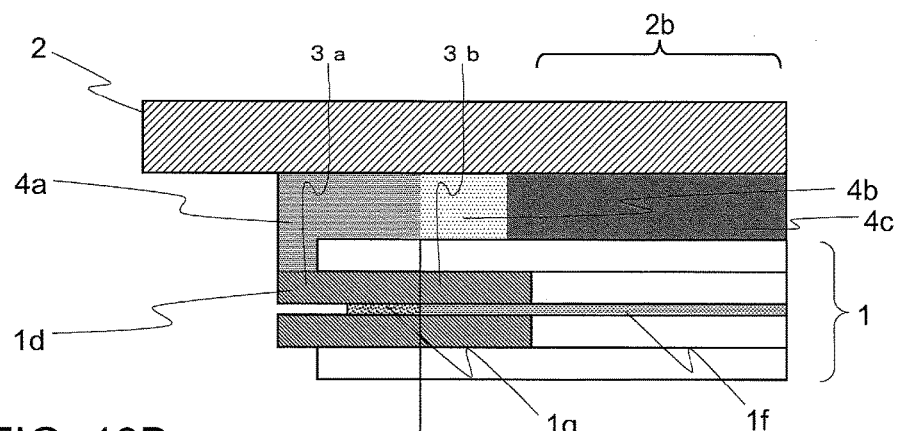
FIG. 10A and FIG. 10B depict a half sectional view of another example of a display apparatus (having a structure employing a transparent cover plate for the cover plate) of Example 1 and a graph of the curing degree.
Figure 10B:
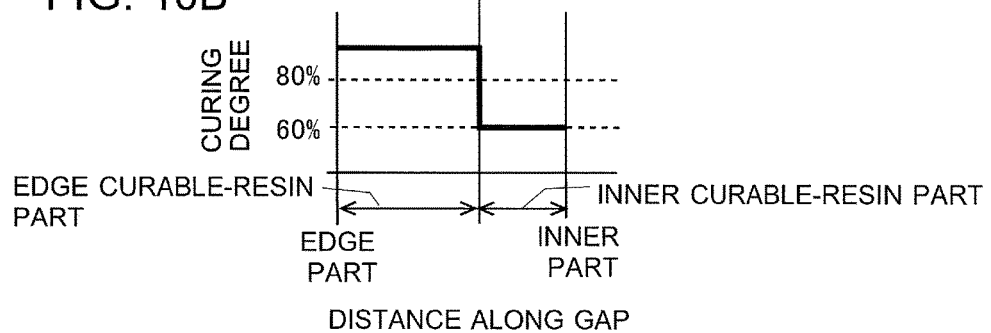

Although structures that each of the base and the cover plate 2 includes a light-shielding section, which can block light, have been described above, there may be provided a structure that any one of the base and the cover plate 2 includes such a light-shielding section. For example, there can be provided a structure employing touch sensor 5 for the base without a light-shielding section as illustrated in FIGS. 9A and 9B, or a structure employing cover plate 2 without a light-shielding section as illustrated in FIGS. 10A and 10B.

In order to confirm effects of the display apparatuses described above, the inventors have confirmed, by using photo-curable resin cured uniformly, the curing degree and the adhesion strength to the cover plate against external force. The result is shown in the following Table 1.

The curing degree of the photo-curable resin in Table 1 was calculated as follows. There were prepared curable resin before irradiation of light and curable resin after irradiation of light, and a resin composition contained in the curable resin before the irradiation and a photo-curable component (e.g., vinyl group C=C) contained in the curable resin after the irradiation were extracted from spectra measured with instrument such as a FT-IR spectrometer. The peak intensity ($P_0$) of the resin composition contained in the curable resin before the irradiation and the peak intensity ($P_1$) of the photo-curable component contained in the curable resin after the irradiation were obtained, and then the curing degree of the curable resin after the irradiation was calculated with Expression (1) below.

$$\text{Curing degree (\%)} = ((P_0 - P_1)/P_0) \times 100 \qquad (1)$$

The photo-curable resin having the curing degree of 80% or more exhibited the adhesion strength of 0.24 N/mm² or more, and the photo-curable resin having the curing degree of 60% or less exhibited the adhesion strength of 0.15 N/mm² or less. The photo-curable resin having the curing degree of 80% exhibited the adhesion strength of 1.6 times that of the photo-curable resin having the curing degree of 60%. The greater adhesion strength can be obtained by raising the curing degree. The photo-curable resin having the curing degree of around 100% exhibited the adhesion strength of 0.32 N/mm² or more.

The appearance condition by external force in Table 1 is determined by separation of the end, existence of air bubbles in the display region, and occurrence of liquid leakage. The condition is "C" when air bubbles are produced and liquid leakage is caused. The condition is "B" when there is separation but no air bubbles in the display region and no liquid leakage. The condition is "A" when there is no separation, no air bubbles, and no liquid leakage.

TABLE 1

| Curing degree of photo-curable resin | Adhesion strength (N/mm²) | Appearance condition due to external force (occurrence of separation or the like) |
| --- | --- | --- |
| 100% | 0.34-0.37 | A |
| 90% | 0.33-0.36 | A |
| 80% | 0.30-0.33 | A |
| 70% | 0.10-0.30 | B |
| Less than 60% | not more than 0.2 | C |
| Less than 50% | not more than 0.1 | C |

Further, the inventors have confirmed, by using photo-curable resin cured uniformly, the curing degree, the elastic modulus, and the influence of external force on the displaying condition. The result is shown in the following Table 2.

In Table 2, the conditions of the photo-curable resin are represented as follows assuming that temperature of usage environment or storing environment (e.g., about 25° C.) and the installation condition (e.g., portrait installation): The condition where the photo-curable resin flows out from the gap in an uncured state or a low curing state is "fluidized" (=B); and the condition where the curing reaction has advanced and the photo-curable resin does not flow out of the gap is "non-fluidized" (=A).

The displaying conditions due to external force are represented as follows: The condition is "C" when there is notable pressing unevenness or the like; "B" when there is slight pressing unevenness or the like; and "A" when the condition is good and there is no development of pressing unevenness or the like.

The photo-curable resin having the curing degree of 80% or more exhibited a non-fluidized state and the elastic modulus of 7 KPa or more, the photo-curable resin having the curing degree of 60% exhibited a non-fluidized state and the elastic modulus of 5 KPa or less. However, the photo-curable resin having the curing degree of 50% became in a fluidized state (elastic modulus is 1 KPa or less) and flowed out from the gap between the base and the cover plate. Further, if the curable resin is cured to have the curing degree of 80% or more, the displaying condition of the liquid crystal display unit used in the base gets worse due to external force causing pressing unevenness, and if the curable resin is cured to have the curing degree is 60% or less, it is hard to see the pressing unevenness.

TABLE 2

| Curing degree of photo-curable resin | Condition of photo-curable resin | Elastic modulus (KPa) | Displaying condition due to external force (e.g., pressing unevenness) |
|---|---|---|---|
| 100% | non-fluidized = A | 11-13 | C |
| 90% | non-fluidized = A | 9-11 | C |
| 80% | non-fluidized = A | 7-9 | C |
| 70% | non-fluidized = A | 5-7 | B |
| 60% | non-fluidized = A | 2-5 | A |
| 50% | fluidized = B | 1 or less | A |

As the display apparatus the present example illustrated in FIGS. 3A and 3B, in the case that the photo-curable resin at the inner part in the gap between the light-shielding member 3 of the cover plate 2 and the wiring region 1d of the base was cured to have the curing degree of around 60% and be in a non-fluidized curing state, and that the photo-curable resin at the edge part is cured to have the curing degree of 80% or more and be in a curing state, the adhesion strength was 0.31 N/mm² and thus it was possible to obtain a good result with respect to the displaying condition due to external force. Further, the photo-curable resin at the inner part has the elastic modulus of 5 KPa or less and thus it was possible to obtain a good result with respect to the displaying condition due to external force.

It should be noted that a structure that defines the condition of the curable resin 4 according to the curing degree has been described in this example. However, when the curing degree is high, the elastic modulus and adhesion strength are generally high, and when the curing degree is low, the elastic modulus and adhesion strength are low. Accordingly, with respect to the elastic modulus, the curable resin was cured such that the elastic modulus after being cured of the inner curable-resin part 4b is lower than the elastic modulus after being cured of the edge curable-resin part 4a. With respect to the adhesion strength, the curable resin was cured such that the adhesion strength after being cured of the edge curable-resin part 4a is larger than the adhesion strength after being cured of the inner curable-resin part 4b.

Although the above-described Table 1 and Table 2 are evaluation results of photo-curable resin, the curable resin 4 of this example is not limited to photo-curable resin, and structures such as of this example can be achieved by controlling the curing state based on characteristics as shown in the tables also in the curable resin 4 of other type, such as heat-curable resin and hybrid curable resin.

Next, a manufacturing method of the display apparatus in a case where the structure of the display apparatus as an embodiment of the present invention is applied to a display apparatus in which the entire surface of the base using the liquid crystal panel 1 for the image display region is adhered to the cover plate 2 having the light-shielding member 3 with the curable resin 4 which is photo-curable resin will be described with reference to FIGS. 11A to 11D.

Figure 11A:
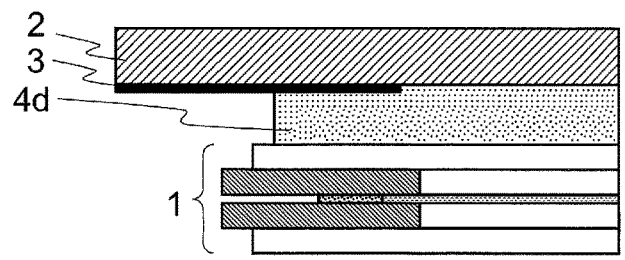
FIGS. 11A to 11D depict half sectional views schematically illustrating a method of manufacturing a display apparatus of Example 1.

First, as shown in FIG. 11A, the base and the cover plate 2 are adhered together with uncured curable resin 4d by applying photo-curable resin onto at least one of the liquid crystal panel 1 as the base and the cover plate 2 having the light-shielding member 3; adjusting positions of the base and the cover plate 2. In order to prevent, for example, displacement at the time of conveying to the next step after adhering, the photo-curable resin may be temporarily cured partially.

Techniques for applying photo-curable resin are not limited in particular. Examples include: techniques that use a dispenser, a coater, and printing. Among those techniques, the technique that uses a dispenser is preferable from the point of controlling the amount of application and preventing incorporation of air bubbles upon adhesion.

In addition, techniques for adjusting positions of the base and the cover plate 2 are not limited in particular. Examples include: a technique of positioning by external shape reference, and an image processing positioning technique that adjusting the positions of a pattern of the light shielding member on the cover plate 2 and a positioning mark for adhesion (not illustrated) provided on the liquid crystal panel 1 of the base, by using image processing. Among those techniques, the image processing positioning technique is preferable from the point of positioning accuracy.

In addition, techniques for adhering together the base and the cover plate 2 are not limited in particular. For example, with respect to adhering environment, the following techniques can be used: a technique of adhering them together under ordinary pressure, and a technique of adhering them together under vacuum. With respect to adhering methods, the following techniques can be used: a technique of adhering them together with rollers, and a technique of adhering them together with parallel plates. Among those techniques, the technique of adhering together with the parallel plate under vacuum is preferable from the viewpoint of preventing air bubbles at the time of adhering.

Figure 11B:
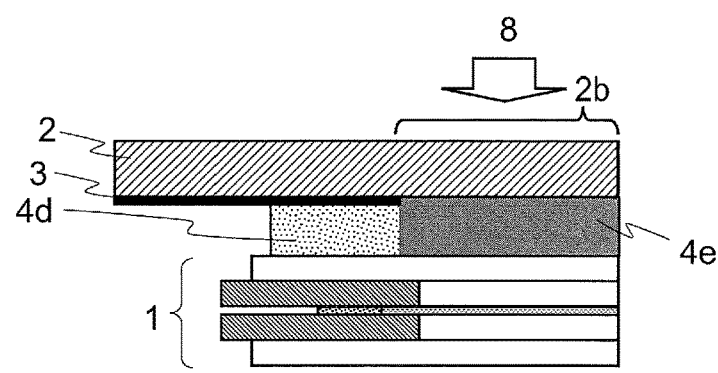

Next, as shown in FIG. 11B, the adhered body is irradiated with UV rays 8 from upward of the cover plate 2 or downward of the base such that the photo-curable resin located below the light-transmission region 2b of the cover plate 2 is cured (cured curable resin 4e). FIG. 11B shows an example of the irradiation from upward of the cover plate 2.

Techniques of curing photo-curable resin below the light-transmission region 2b of the cover plate 2 are not limited in particular. Examples include: a technique of placing the cover plate 2 and the base, which are adhered together, with the cover plate 2 on the upper side and collectively irradiating them with a UV lamp arranged above the cover plate 2; a technique of irradiating by scanning uniformly with a spot UV lamp; and a technique of placing the cover plate 2 and the base with the cover plate 2 on the lower side and irradiating them with a UV lamp arranged beneath the cover plate 2 while conveying them with a conveyor. Among those techniques, the technique of irradiating the cover plate 2 and the base with a UV lamp while conveying them by a conveyor is preferable from the viewpoint of homogeneousness of the curing state of the curable resin after the irradiation.

Figure 11C:
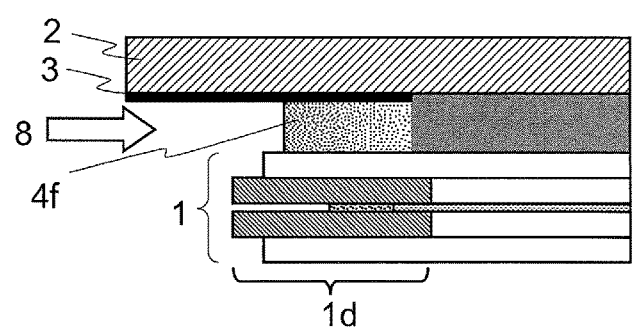

Next, as shown in FIG. 11C, photo-curable resin is cured with UV light 8 to up to the inner portion in the gap between the light-shielding member 3 of the cover plate 2 and the wiring region 1d of the base (curable resin 4f with curing degree of about 60%).

Techniques of curing photo-curable resin at the inner part in the gap between the cover plate 2 and the base are not limited in particular. Examples include: a technique of using an LED light source that can emit long-wavelength light of about 400 nm wavelength, a technique of using an optical lens or the like that can convert light beams into parallel light, and a technique of irradiating with the light source located in a position parallel to the gap. From the point of making irradiation light reach the inner part of the gap and stably curing the curable resin at the inner part, it is preferable for this example to combine the above techniques to obtain a technique of irradiating light from a position in parallel to the gap by using a light source that can emit long-wavelength light and an optical lens that can convert light beams into parallel light.

Figure 11D:
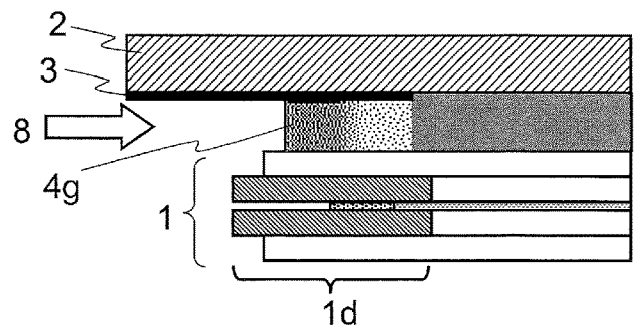

Next, as shown in FIG. 11D, the photo-curable resin at the edge part of the gap between the light-shielding member 3 of the cover plate 2 and the wiring region 1d of the base is cured with UV rays 8 (curable resin 4g of curing degree of 80% or more). Since photo-curable resin at the outer part in the gap between the light-shielding member 3 of the cover plate 2 and the wiring region 1d of the base has been cured to some extent with UV rays 8 (UV rays with a long wavelength of about 400 nm) in FIG. 11C, the wavelength and illuminance level of UV rays 8 may be adjusted such that the curing degree is 80% or more as a result of irradiation of the UV rays of this step.

Techniques of curing the photo-curable resin in the edge part of the gap between the cover plate 2 and the base is not limited in particular. Examples include: a technique of using an LED light source that can emit short-wavelength light of about 360 nm; a technique of using an optical lens or the like that can condense light beams into a spot form; and a technique of irradiating from obliquely downward of the gap. From the point of concentrating light at the end position of the gap and stably curing the curable resin at the edge part of the gap, it is preferable to combine the above techniques in this example to obtain a technique of irradiating from obliquely downward of the gap by using a light source that can emit short-wavelength light and an optical lens that can condense light beams into a sport form.

Next, another manufacturing method of the display apparatus of this example will be described with reference to FIGS. 12A to 12D.

Figure 12A:
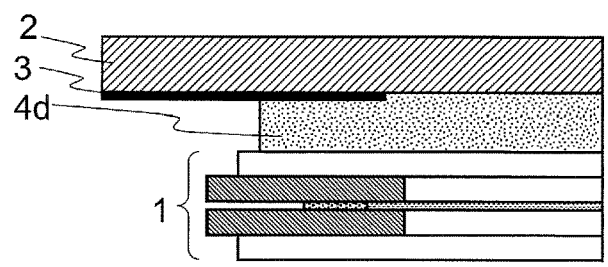
FIGS. 12A to 12D depict half sectional views schematically illustrating another method of manufacturing a display apparatus of Example 1.
Figure 12B:
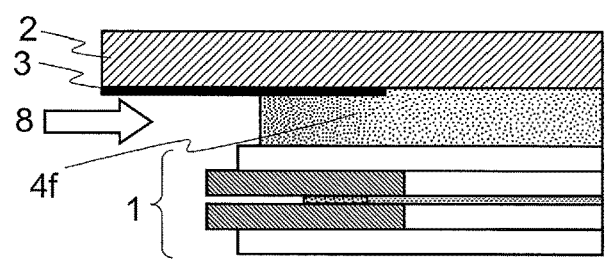
Figure 12C:
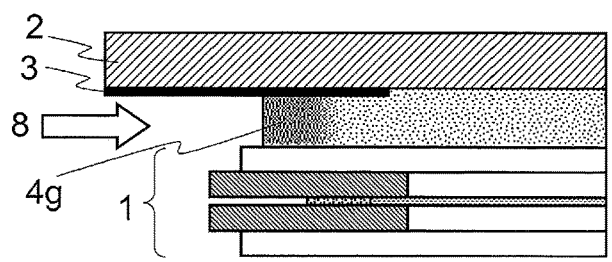
Figure 12D:
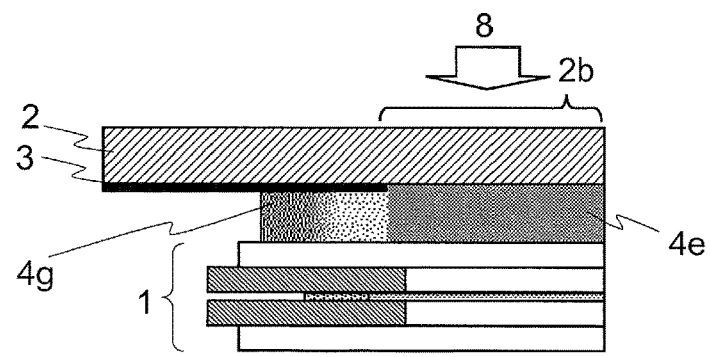

First, as shown in FIG. 12A, the base and the cover plate 2 are adhered together by applying photo-curable resin onto at least one of the liquid crystal panel 1 as the base and the cover plate 2 having the light-shielding member 3; and adjusting positions of the base and the cover plate 2. Next, as shown in FIG. 12B, the photo-curable resin is cured with UV rays 8 up to the inner part of the gap between the light-shielding member 3 of the cover plate 2 and the base (curable resin 4f having a curing degree of about 60%). Similarly to the above, this step can be performed using the technique of irradiating the curable resin from a position in parallel to the gap using a light source that can emit long-wavelength light of about 400 nm and an optical lens that can convert light beams into parallel light. Next, as shown in FIG. 12C, photo-curable resin at the edge part of the gap between the light-shielding member 3 of the cover plate 2 and the base is cured with UV rays 8 (curable resin 4g of the curing degree of 80% or more). Similarly to the above, this step can be performed using a technique of irradiating the curable resin from obliquely downward of the gap using a light source that can emit short-wavelength light of about 360 nm and an optical lens that can condense light beams into a spot form. Similarly to the above, the photo-curable resin in at the edge part of the gap between the light-shielding member 3 of the cover plate 2 and the base has been cured to some extent with UV rays 8 in FIG. 12B. Therefore, the wavelength and illuminance level of UV rays 8 may be adjusted so as to cure the curable resin to have the curing degree of 80% or more with irradiation of UV rays of this step. Next, as shown in FIG. 12D, the curable resin is irradiated with UV light 8 from upward of the cover plate 2 or downward of the base (upward from the cover plate 2 in FIG. 12D) and the photo-curable resin located below the light-transmission region 2b of the cover plate 2 (cured curable resin 4e) is cured. Similarly to the above, this step can be performed using, for example, the technique of irradiating the cover plate 2 and the base, which were adhered together, with a UV lamp while conveying them by a conveyor.

According to this method, it is possible to incorporate the steps in FIGS. 12A, 12B and 12C into the same manufacturing apparatus. In addition, by processing the step in FIG. 12B with the same manufacturing apparatus after adhering the cover plate 2 and the base together in FIG. 12A, it is possible to also serve as temporary curing required in order to prevent displacement of the cover plate 2 and the base upon conveying the adhered product to the next step after the adhering process.

Next, a method of manufacturing a display apparatus by using heat-curable resin as curable resin 4 will be described with reference to FIGS. 13A to 13D.

Figure 13A:
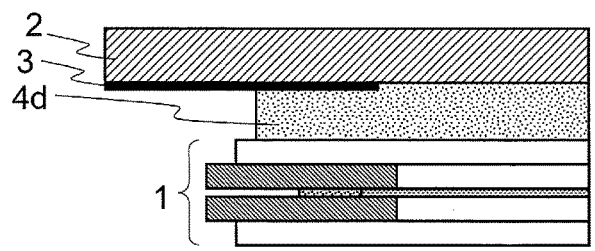
FIGS. 13A to 13D depict side half sectional views schematically illustrating another method of manufacturing a display apparatus of Example 1, using heat-curable resin for the curable resin.
Figure 13B:
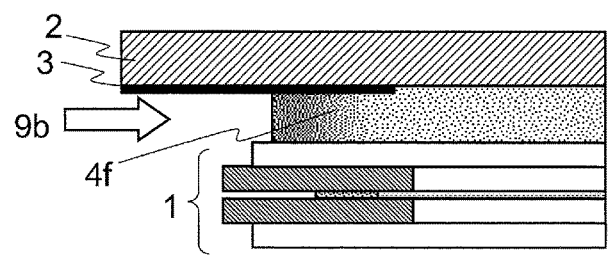
Figure 13C:
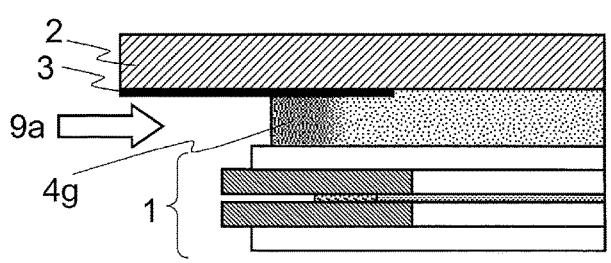
Figure 13D:
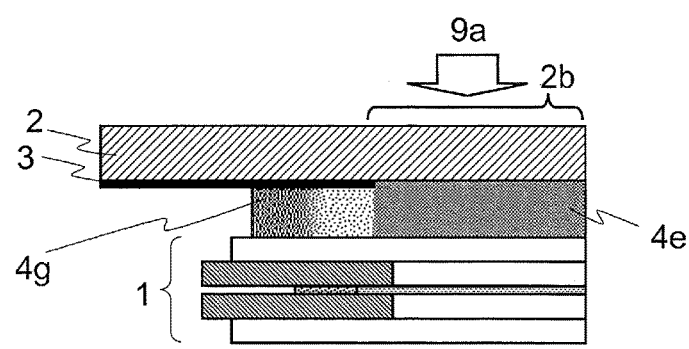

First, as shown in FIG. 13A, the base and the cover plate 2 are adhered together by applying heat-curable resin onto at least one of the liquid crystal panel 1 as the base and the cover plate 2 having the light-shielding member 3; adjusting positions of the base and the cover plate 2. Next, as shown in FIG. 13B, the heat-curable resin is cured with far-infrared rays 9b up to the inner part of the gap between the light-shielding member 3 of the cover plate 2 and the base (curable resin 4f having a curing degree of about 60%). Next, as shown in FIG. 13C, heat-curable resin at the edge part the gap between the light-shielding member 3 of the cover plate 2 and the base is cured with far-infrared rays 9a (curable resin 4g of the curing degree of 80% or more). Similarly to the above, the heat-curable resin at the edge part of the gap between the light-shielding member 3 of the cover plate 2 and the base has been cured to some extent with far-infrared rays 9b in FIG. 13B. Therefore, the wavelength and illuminance level of far-infrared rays 9b may be adjusted so as to cure the curable resin to have the curing degree of 80% or more with irradiation of far-infrared rays 9b of this step. Next, as shown in FIG. 13D, the curable resin is irradiated with far-infrared rays 9b from upward of the cover plate 2 or downward of the base (upward from the cover plate 2 in FIG. 13D) and the heat-curable resin located below the light-transmission region 2b of the cover plate 2 (cured curable resin 4e) is cured.

According to this process, it is possible to achieve the structures in FIGS. 1A to 10B described above even when heat-curable resin is used as the curable resin 4.

Furthermore, a method of manufacturing a display apparatus by using hybrid curable resin having moisture curability as the curable resin 4 will be described with reference to FIGS. 14A to 14D.

Hybrid curable resin is curable resin 4 having moisture curability additionally, such as photo-curability and heat-curability. When the hybrid curable resin having photo-curability and moisture-curability is used, it is possible to manufacture the display apparatus by combining the moisture curing process with the manufacturing method in FIGS. 11A to 11D and 12A to 12D.

Figure 14A:
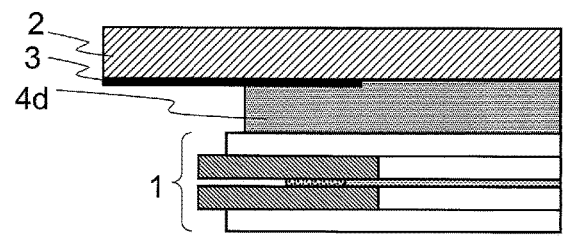
FIGS. 14A to 14D depict side half sectional views schematically illustrating another method of manufacturing a display apparatus of Example 1, using hybrid curable resin having moisture curability for the curable resin.
Figure 14B:
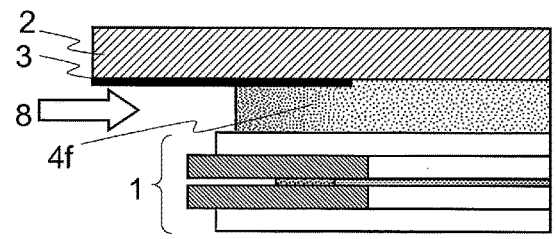
Figure 14C:
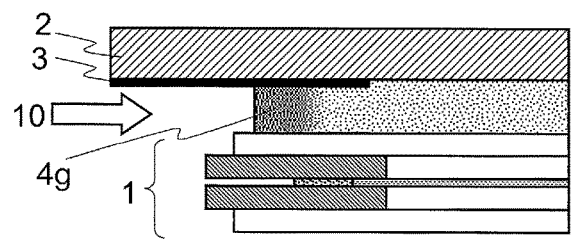
Figure 14D:
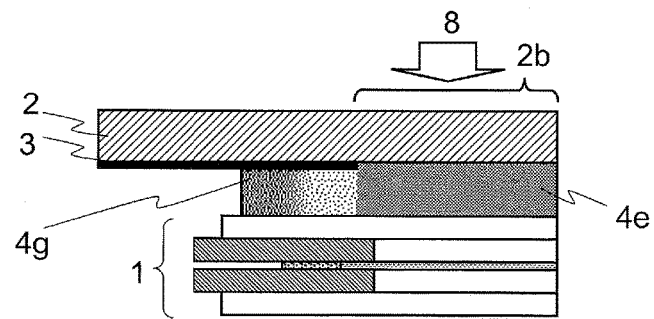

For example, as shown in FIG. 14A, the base and the cover plate 2 are adhered together by applying the hybrid curable resin onto at least one of the liquid crystal panel 1 as the base and the cover plate 2 having the light-shielding member 3; and adjusting positions of the base and the cover plate 2. Next, as shown in FIG. 14B, the hybrid curable resin is cured with UV rays 8 up to the inner part of the gap between the light-shielding member 3 of the cover plate 2 and the base. Next, as shown in FIG. 14C, the hybrid curable resin at the edge part of the gap between the light-shielding member 3 of the cover plate 2 and the base is cured by adding moisture 10. Next, as shown in FIG. 14D, the hybrid curable resin is irradiated with UV light 8 from upward of the cover plate 2 or downward of the base (upward from the cover plate 2 in FIG. 14D) and the hybrid curable resin located below the light-transmission region 2b of the cover plate 2 is cured.

According to this method, it is possible to achieve the structures in FIGS. 1A to 6B described above even when hybrid curable resin is used as the curable resin 4.

Further, it is possible to achieve the structures in FIGS. 1A to 10B described above by combining the manufacturing methods of FIGS. 13A to 13D and FIGS. 14A to 14D when hybrid curable resin having features of the heat-curability and the moisture-curability is used as the curable resin 4.

In FIGS. 11A to 14A, after curing the curable resin up to the inner part of the gap between the light-shielding member 3 of the cover plate 2 and the base (namely, the entire curable resin shielded by the light-shielding member 3), the curable resin at the end position of the gap between the light-shielding member 3 of the cover plate 2 and the base is cured. Alternatively, it is also possible to cure the curable resin up to the inner position after curing the curable resin at the side of the end position in advance. In that case, the curable resin at the side of the end position is further cured by the next curing step, and thus it is desirable to adjust the curing conditions in a previous curing step in consideration of the curing in a later curing step.

Next, functioning of the display apparatus in Example 1 will be described with reference to FIGS. 15A to 15D and 16A to 16D.

As shown in FIGS. 15A to 15D, it is assumed that external force 11 in the separation direction is applied to either one of the cover plate 2 and the base thus adhered together (cover plate 2 in this description about the functioning).

Figure 15A:
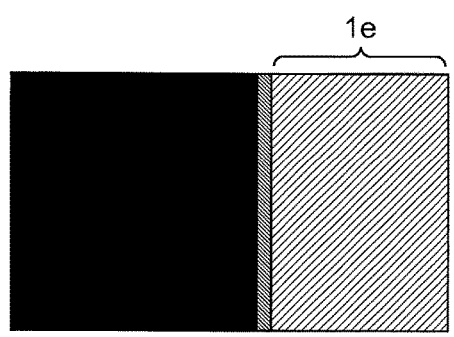
FIGS. 15A to 15D depict diagrams partial plan view and half sectional view of a display apparatus for illustrating examples that external force in the direction of pulling and separating the cover plate from the base is applied to the cover plate adhered to the base.
Figure 15B:
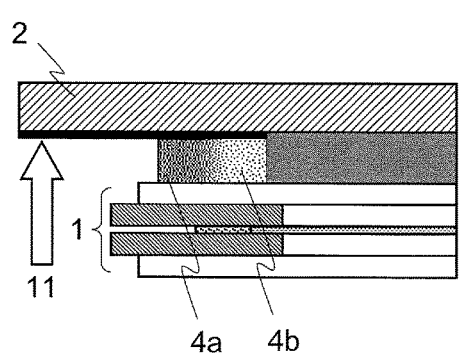

As shown in FIGS. 15A and 15B, the external force 11 in the separation direction is applied to the edge region-curable part 4a. However, since the edge region-curable part 4a is sufficiently cured, it is hard to separate because of the adhesion strength of the curable resin 4. In addition, even if the separation occurs, the inner curable-resin part 4b is in a non-fluidized state, and therefore the inner curable-resin part 4b does not flow out from the gap and does not contaminate the cover plate 2, the base, and the ambient surrounding thereof.

Figure 15C:
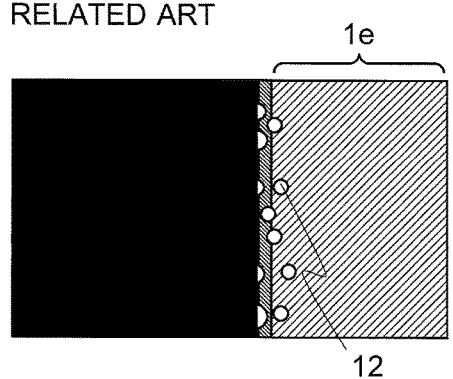
Figure 15D:
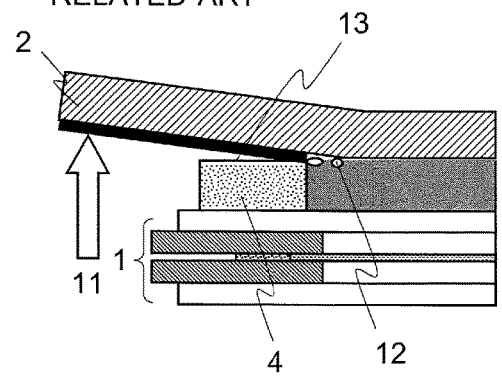

On the other hand, as shown in FIGS. 15C and 15D, if the curing degree after the curable resin 4 in the gap is cured is uniformly low, separation 13 of the cover plate 2 and the base from the curable resin 4 occurs and air bubbles 12 are produced in the display region 1e. Furthermore, if the curing is insufficient inside the gap, the uncured portion of the curable resin 4 flows out so as to contaminate the cover plate 2, the base, and the ambient surrounding.

As shown in FIGS. 16A to 16D, it is assumed that external force 11 in the pressing direction is applied by touch operation or the like onto either one of the cover plate 2 and the base thus adhered together (cover plate 2 in this operational description).

Figure 16A:
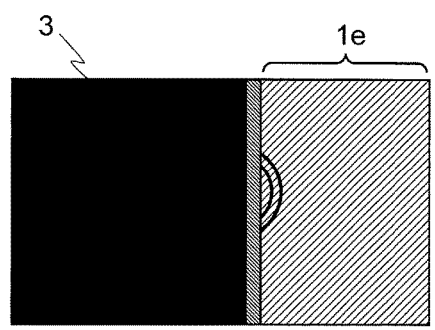
FIGS. 16A to 16D depict diagrams partial plan view and half sectional view of a display apparatus for illustrating examples that external force in the direction of pressing the cover plate is applied to the cover plate.
Figure 16C:
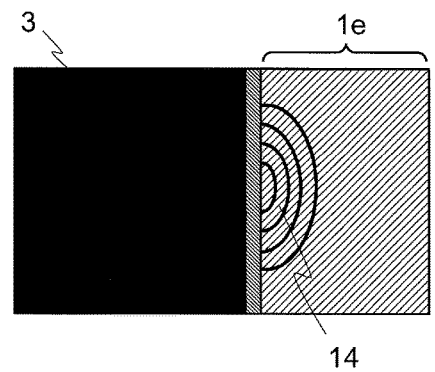
Figure 16B:
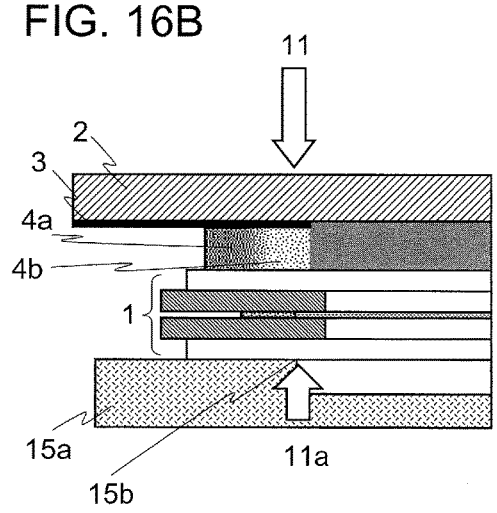

As shown in FIGS. 16A and 16B, the external force 11 in the pressing direction is applied also to the inner curable-resin part 4b in the gap. However, since the inner curable-resin part 4b is sufficiently soft, the inner curable-resin part 4b absorbs stress coming from the external force and reduces the stress 11a.

Figure 16D:
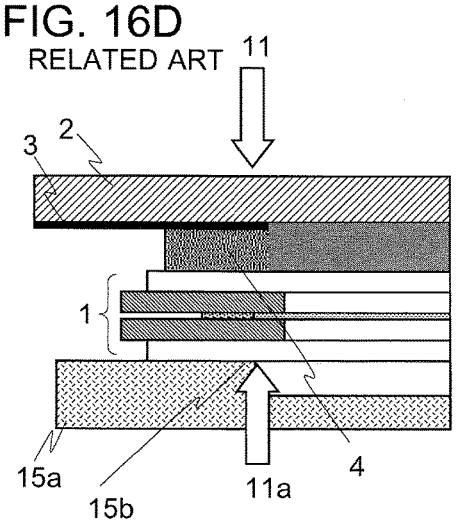

Meanwhile, as shown in FIGS. 16C and 16D, the stress transmitted to the liquid crystal panel 1 through the inner curable-resin part 4b is further transmitted to the backlight chassis 15a having a substrate support 15b supporting the end of the liquid crystal panel 1, and the stress 11a received by the base is applied to the liquid crystal panel 1 as a result of the stress concentrating on the parts where the liquid crystal panel 1 and the backlight chassis 15a contacted.

Here, the stress 11a applied intensively from the substrate support 15b of the backlight chassis 15a changes the height of the gap in the liquid crystal panel 1. However, since the stress 11a is absorbed by the inner curable-resin part 4b so as to be smaller in the structure in FIGS. 16A and 16B, it merely produces slight wave-form display defects 14. Meanwhile, as in FIGS. 16C and 16D, if the curing degree after the curable resin 4 in the gap is cured is uniformly high such that elastic modulus is high, the external force 11 in the pressing direction is not absorbed, and the stress 11a intensively applied from the substrate support 15b of the backlight chassis 15a largely changes the height of the gap in the liquid crystal panel 1 and produces wave-form display defects 14.

As described above, since the curing degree, the elastic modulus and adhesion strength after the edge curable-resin part 4a is cured are made high relatively to the other parts in this example, it is difficult to separate the cover plate 2 and the base from the curable resin 4 due to the external force 11 in the separation direction. Even if the cover plate 2 and the base are separated from the curable resin 4 with the external force 11 in the separation direction, the curable resin 4 does not flow out from the gap. Thus, there is an advantageous effect of preventing the cover plate 2, the base, and their ambient surrounding from contamination. In addition, since the curing degree, the elastic modulus, and the adhesion strength after the inner curable-resin part 4b is cured are made low relatively to the other parts in this example, there is an advantageous effect that the display defect due to the external force 11 in the pressing direction tends not to be produced.

Example 2

Next, a display apparatus and a manufacturing method according to Example 2 will be described. The present example provides an example that the structure of the above-described embodiment is applied to the following display apparatus. The display apparatus includes a base which uses LCD module 15 for the image display region; cover plate 2 including light-shielding member 3; and curable resin 4 which is photo-curable resin. The entire surface of the base is adhered to the cover plate 2 with the photo-curable resin 4. Hereinafter, the structure of Example 2 will be described with reference to FIGS. 17A to 18B.

The base is an LCD module 15 and includes: a liquid crystal panel 1 that displays images; a backlight chassis 15a which has a liquid crystal panel 1 and provides a light source for displaying and display signals downward; and a metal flame 15c for protecting the liquid crystal panel 1 and the backlight chassis 15a. Since the structure of the liquid crystal panel 1 is the same as that of Embodiment 1, the description thereof will be omitted.

Figure 17A:
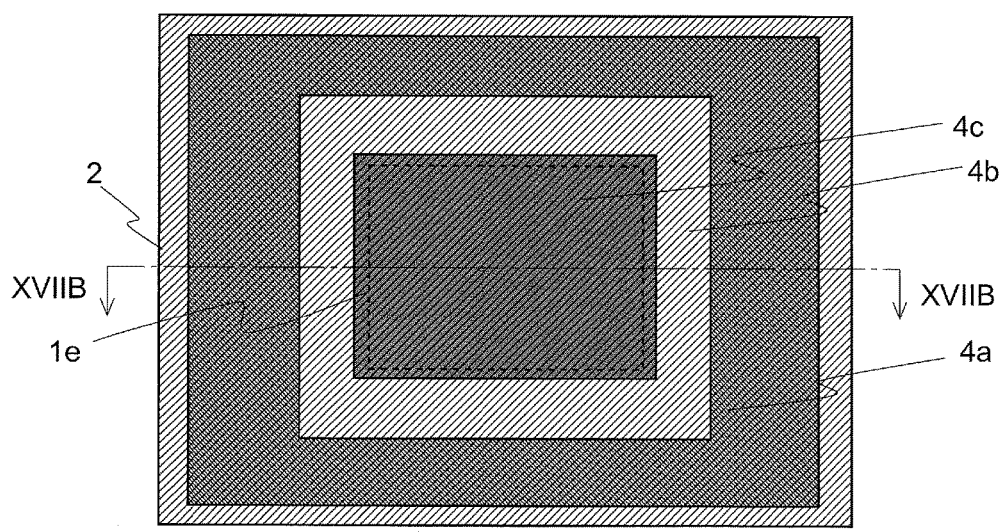
FIG. 17A and FIG. 17B depict a plan view and a sectional view illustrating an example of a display apparatus (having a structure using a LCD module for the base) of Example 2.
Figure 17B:
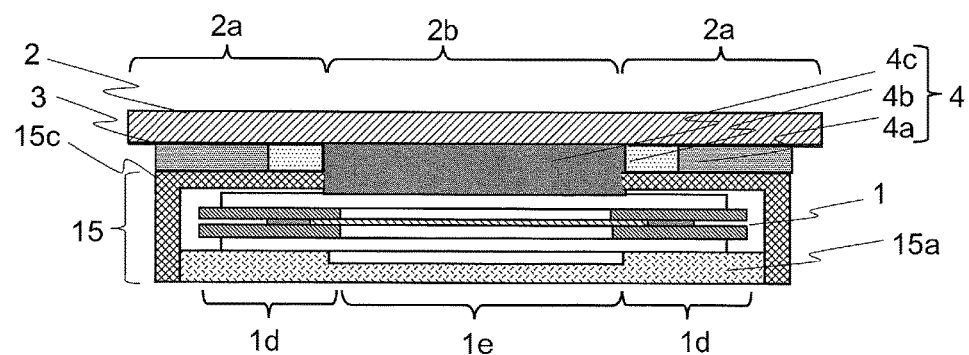
Figure 18A:
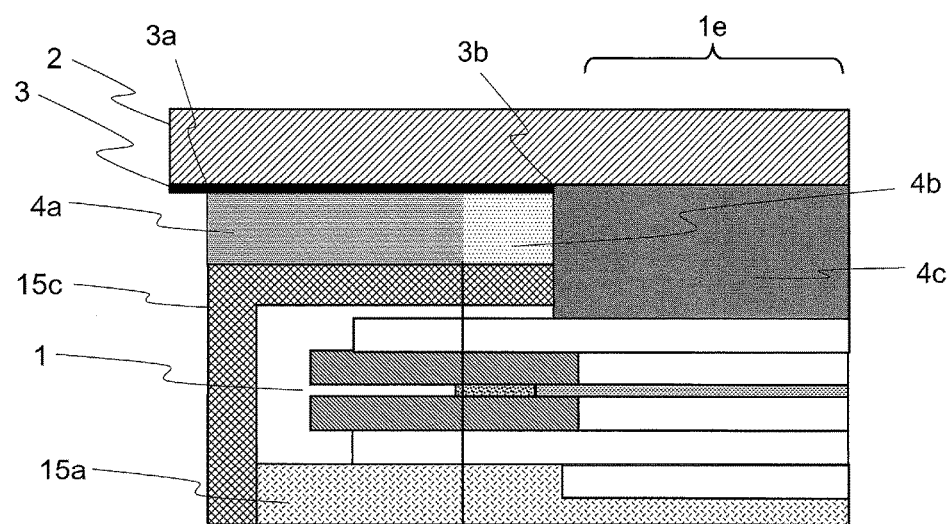
FIG. 18A and FIG. 18B depict a half sectional view of an example of a display apparatus (having a structure using a LCD module for the base) of Example 2 and a graph of the curing degree.
Figure 18B:
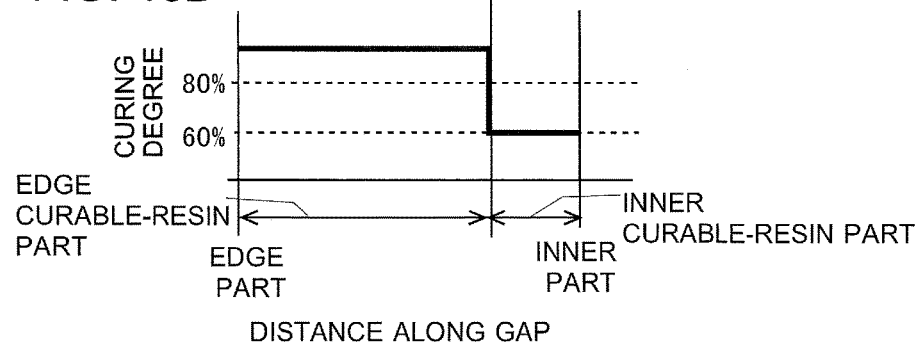

FIG. 17A is a plan view of the display apparatus, and FIG. 17B is a sectional view of the display apparatus, taken along the line XVIIB-XVIIB in FIG. 17A. FIG. 18A and FIG. 18B are a half sectional view of the display apparatus and a graph of an example of the curing degree of the curable resin with respect to distance along a gap between the base and the cover plate 2.

As shown in FIGS. 17A and 17B, a metal flame 15c of the LCD module 15 is a flame that uses a light blocking metal plate or the like. The metal flame 15c is arranged so as to cover the wiring region 1d of the liquid crystal panel 1 and the outer edge part (peripheral part) of the backlight chassis 15*a* and a part corresponding to the display region 1*e* of the liquid crystal panel 1 is opened.

Photo-curable resin is used for the curable resin 4 for adhering the base and the cover plate 2 having the light-shielding member 3 together. The gap between the base and the cover plate 2 is filled with the photo-curable resin up to the outer edge of the metal frame 15*c*. The photo-curable resin in the gap between the light-shielding member 3 of the cover plate 2 and the metal flame 15*c* of the base is cured by light. The photo-curable resin is cured as follows. The curing degree (or elastic modulus and adhesion strength), which is obtained after a curing process, of the inner curable-resin part 4*b* located in the vicinity 3*b* of the inner edge of the light-shielding member 3 (inner part), differs from the curing degree (or elastic modulus and adhesion strength), which is obtained after a curing process, of the edge curable-resin part 4*a* located a side 3*a* of the outer edge of the light-shielding member 3 (edge part). That is, the inner curable-resin part 4*b* is lower in curing degree (or elastic modulus and adhesion strength) after a curing process than the edge curable-resin part 4*a*.

For example, it is preferable that, as shown in FIGS. 18A and 18B, the curing degree after a curing process of the inner curable-resin part 4*b* located nearby the display region 1*e* of the base and in the vicinity 3*b* of the inner edge of the light-shielding member 3 is about 60%, which is in a non-fluidized cured state, and the curing degree after a curing process of the edge curable-resin part 4*a* located at a side 3*a* of the outer edge of the light-shielding member 3 is equal to 80% or more, which is in a cured state.

In the structure of this example, functioning of the display apparatus when external force in the pressing direction is applied onto either one of the cover plate 2 and the base adhered together by a touch operation or the like (see the functioning shown in FIGS. 16A and 16B) is the same as Example 1.

In the functioning of the display apparatus (the functioning in FIGS. 15A and 15B) when external force 11 in the separation direction is applied to one of the cover plate 2 and the base adhered together, separation hardly occurs as a result of the adhesion strength of the sufficiently cured edge curable-resin part 4*a*. Further, the gap between the light-shielding member 3 of the cover plate 2 and the metal flame 15*c* of the base is filled with the photo-curable resin up to the end of the metal flame 15*c*. Accordingly, the area where the curable resin 4 contacts with the cover plate 2 and the metal flame 15*c* increases, and thus it is possible to increase regions having high curing degree, which increases the adhesion strength.

As described above, in addition to the advantageous effect of Example 1, this example has an advantageous effect that separation of the cover plate 2 and the base hardly occurs due to the external force 11.

Example 3

Next, a display apparatus and a manufacturing method according to Example 3 will be described. The present example provides an example that the structure of the above-described embodiment is applied to the following display apparatus. Additionally to the structure of Example 1, the display apparatus further includes gap-forming member 16 in a gap between the base and the cover plate 2. The entire surface of the base is adhered to the cover plate 2 with the photo-curable resin.

Hereinafter, the structure of Example 3 will be described with reference to FIGS. 19A to 20B. Since the base and the cover plate 2 are the same as that of Example 1, the description thereof will be omitted.

Figure 19A:
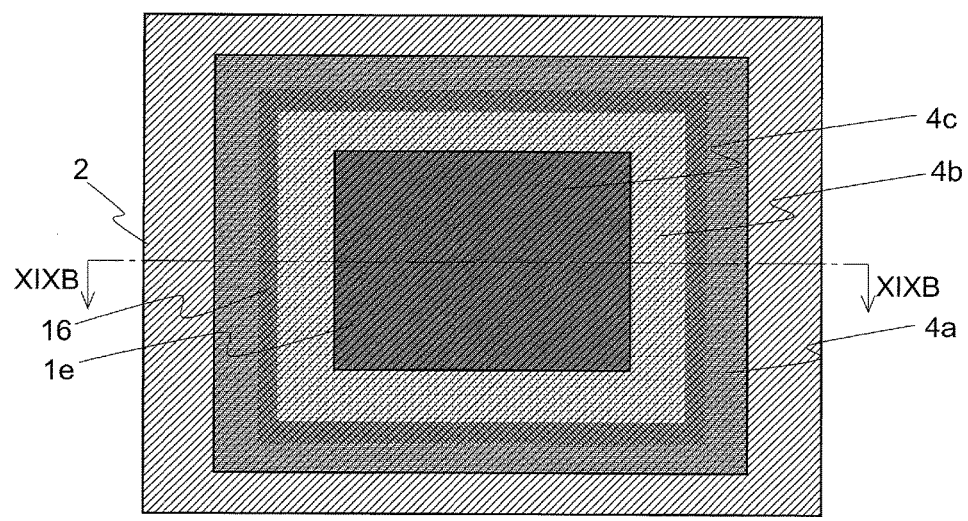
FIG. 19A and FIG. 19B depict a plan view and a sectional view illustrating an example of a display apparatus (having a structure using a gap-forming member put between the base and the cover plate) of Example 3.
Figure 19B:
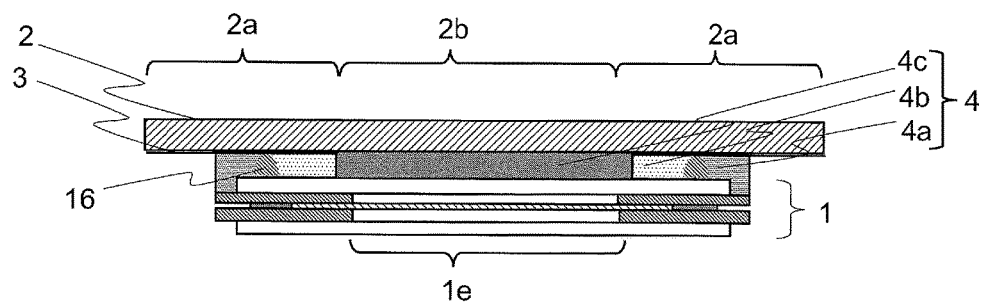
Figure 20A:
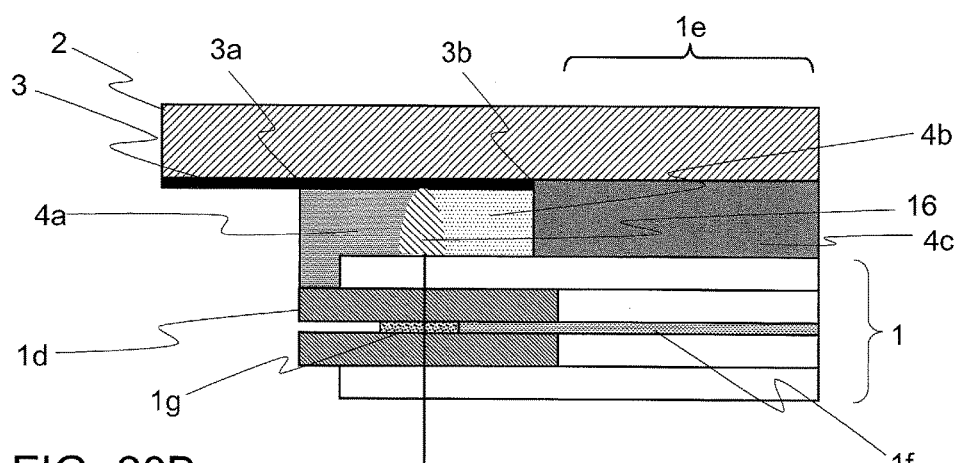
FIG. 20A and FIG. 20B depict a half sectional view of an example of a display apparatus (having a structure using a gap-forming member put between the base and the cover plate) of Example 3 and a graph of the curing degree.
Figure 20B:
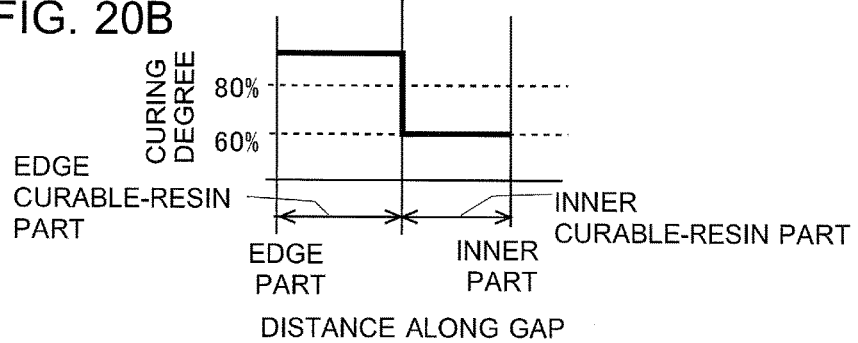

FIG. 19A is a plan view of the display apparatus, and FIG. 19B is a sectional view of the display apparatus, taken along the line XIXB-XIXB in FIG. 19A. FIG. 20A and FIG. 20B are a half sectional view of the display apparatus and a graph of an example of the curing degree of the curable resin with respect to distance along a gap between the base and the cover plate 2.

As shown in FIGS. 19A and 19B, the gap-forming member 16 is provided in the gap between the base and the cover plate 2 on the periphery of the display region 1*e* (in the present example, above the seal 1*g* of the liquid crystal panel 1) and has thickness such that the gap between the base and the cover plate 2 becomes a predetermined height. Specifically, the distance between the cover plate 2 and the base is preferably 0.1 mm or more, and more preferably, about 0.5 mm. This is because elasticity of the curable resin 4 at about 0.5 mm hardly causes the separation of the cover plate 2 and the base due to external force, and the curable resin 4 at about 1 mm uses the large amount of resin and increases the cost.

Example of the material used for the gap-forming member 16 include curable resin and double-faced adhesion tape that is cured with light, heat, humidity, or the like. Among those, transparent photo-curable resin material (that has refractive index equivalent to that of the photo-curable resin for adhering the base and the cover plate 2 together) is preferable from the point of the degree of freedom with respect to the thickness, workability and visibility.

Photo-curable resin is used for the curable resin 4 for adhering the base and the cover plate 2 having the light-shielding member 3 together. The gap between the base and the cover plate 2 is filled with the photo-curable resin up to the outer edge of the base, where the amount of the photo-curable resin to be used is defined on the basis of the height of the gap-forming member 16. The photo-curable resin in the gap between the light-shielding member 3 of the cover plate 2 and the base is cured by light, so as to be separated by the gap-forming member 16 into the inner curable-resin part 4*b* located in the vicinity 3*b* of the inner edge of the light-shielding member 3 (inner part) and the edge curable-resin part 4*a* located a side 3*a* of the outer edge of the light-shielding member 3 (edge part). The photo-curable resin is cured as follows. The curing degree (or elastic modulus and adhesion strength), which is obtained after a curing process, of the inner curable-resin part 4*b* differs from the curing degree (or elastic modulus and adhesion strength), which is obtained after a curing process, of the edge curable-resin part 4*a*. That is, the inner curable-resin part 4*b* is lower in curing degree (or elastic modulus and adhesion strength) after a curing process than the edge curable-resin part 4*a*.

For example, it is preferable that, as shown in FIGS. 20A and 20B, the curing degree after a curing process of the inner curable-resin part 4*b* located nearby the display region 1*e* of the base and in the vicinity 3*b* of the inner edge of the light-shielding member 3 is about 60%, which is in a non-fluidized cured state, and the curing degree after a curing process of the edge curable-resin part 4*a* located a side 3*a* of the outer edge of the light-shielding member 3 is equal to 80% or more, which is in a cured state.

In the structure of this example, when external force 11 in the separation direction is applied to either one of the cover plate 2 and base adhered together, the amount of elastic deformation increases because of the thickness of the curable resin 4 increasing with the gap-forming member 16 provided in the gap between the light-shielding member 3 of the cover plate 2 and the base. Thus, it is possible to increase adhesion strength.

On the other hand, when external force in the pressing direction is applied on either one of the cover plate 2 and base adhered together with a touch operation or the like, the external force in the pressing direction is applied to the curable resin 4 inside the gap. However, since the curable resin 4 is sufficiently soft and furthermore the thickness of the soft curable resin 4 increases, the amount of absorption of the stress due to the elastic deformation of the curable resin 4 increases, and thus the display defect tends not to occur.

As described above, in this example, there is an advantageous effect that separation of the cover plate 2 and the base hardly occurs due to external force and that the display defects hardly occurs due to the external force in the pressing direction, in comparison with the case of Example 1.

Example 4

Next, a display apparatus and a manufacturing method according to Example 4 will be described. The present example provides an example that the structure of the above-described embodiment is applied to the following display apparatus. Additionally to the structure of Example 1, the curing degree (or elastic modulus and adhesion strength) after a curing process of the display-region curable-resin part 4c located in the display region 1e is made higher than the curing degree (or elastic modulus and adhesion strength) after a curing process of the inner curable-resin part 4b.

Hereinafter, the structure of Example will be described with reference to FIGS. 21A to 23B. Since the structure of the curable resin 4 of the gap between the base and the cover plate 2 is the same as that of Example 1, the description thereof is omitted.

As shown in FIGS. 21A to 23B, the curing degree (or elastic modulus and adhesion strength), which is obtained after a curing process, of the inner curable-resin part 4b located in the vicinity 3b of the inner edge of the light-shielding member 3 (inner part), differs from the curing degree (or elastic modulus and adhesion strength), which is obtained after a curing process, of the edge curable-resin part 4a located a side 3a of the outer edge of the light-shielding member 3 (edge part). That is, the inner curable-resin part 4b is lower in curing degree (or elastic modulus and adhesion strength) after a curing process than the edge curable-resin part 4a. Further, the display-region curable-resin part 4c located below the display region 1e is higher in curing degree (or elastic modulus and adhesion strength), which is obtained after a curing process than the inner curable-resin part 4b.

Figure 21A:
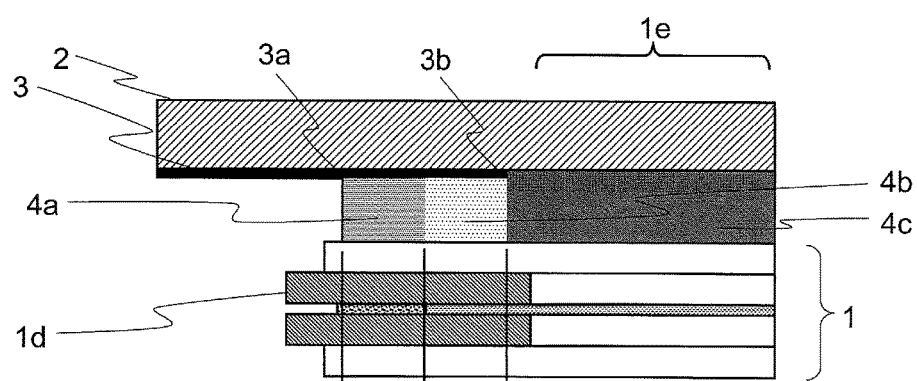
FIG. 21A and FIG. 21B depict a plan view and a half sectional view illustrating another example of a display apparatus (having a structure that a liquid crystal panel is employed for the base and the curing degree of curable resin within a display region is higher than that of the curable resin at the side of outer edge of light-shielding member, namely the edge part) of Example 4 and a graph of the curing degree.
Figure 21B:
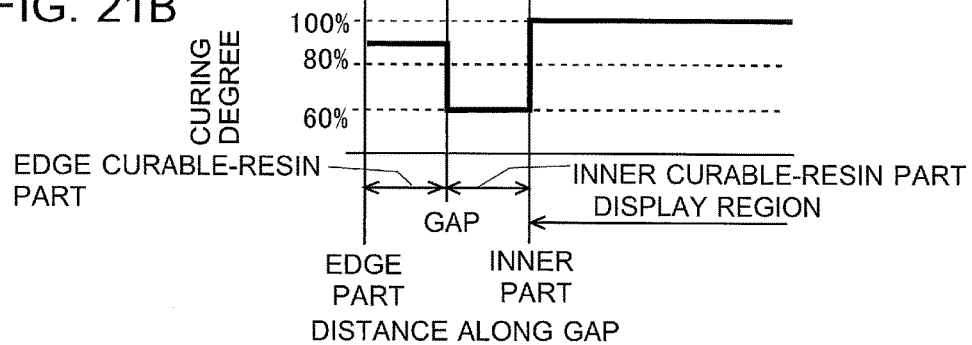

For example, as shown in FIGS. 21A and 21B, in the structure that the display-region curable-resin part 4c located below the display region 1e is higher in curing degree, which is obtained after a curing process than the edge curable-resin part 4a located at a side 3a of the outer edge of the light-shielding member 3, the adhesion strength of the cover plate 2 and the base is such that the adhesion strength of the display-region curable-resin part 4c of is higher than the edge curable-resin part 4a. Even if the edge curable-resin part 4a and the inner curable-resin part 4b are separated when the external force in the separation direction is applied onto either one of the cover plate 2 and base adhered together, the display-region curable-resin part 4c is not separated, which can restricts occurrence of air bubbles in the display region 1e. It should be noted that, in FIGS. 21A and 21B, the curing degree after a curing process of the display-region curable-resin part 4c may be equal to the curing degree after a curing process of the edge curable-resin part 4a.

Figure 22A:
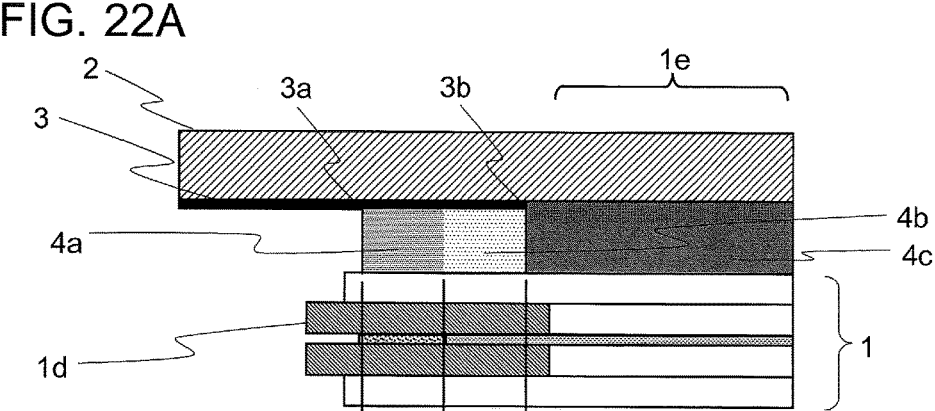
FIG. 22A and FIG. 22B depict a plan view and a half sectional view illustrating another example of a display apparatus (having a structure that a liquid crystal panel is employed for the base, and the curing degree of curable resin within a display region is lower than that of the curable resin at the side of the outer edge of light-shielding member, namely the edge part and is higher than that of the curable resin in the vicinity of the display region, namely the inner part) of Example 4 and a graph of the curing degree.
Figure 22B:
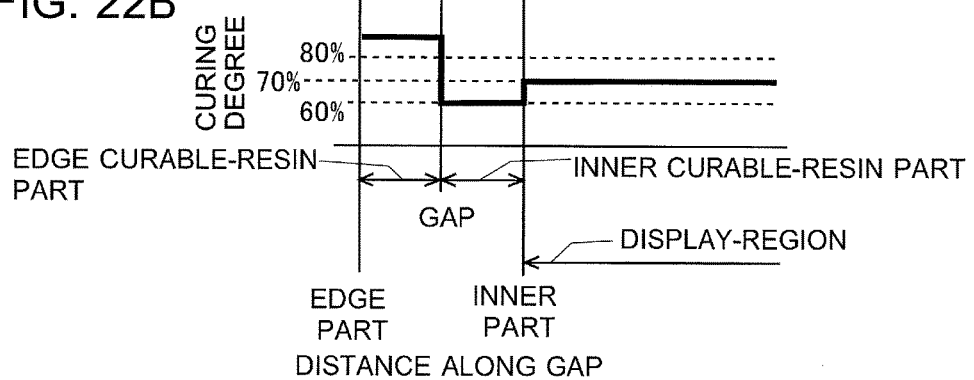

As shown in FIGS. 22A and 22B, in the structure that the display-region curable-resin part 4c located below the display region 1e is lower in curing degree, which is obtained after a curing process, than the edge curable-resin part 4a and is higher in curing degree, which is obtained after a curing process, than the inner curable-resin part 4b, even under the condition that external force in the pressing direction is applied to the display region 1e, the display-region curable-resin part 4c absorbs stress and the display defects hardly occurs since the display-region curable-resin part 4c in the display region 1e is soft. It should be noted that, in FIGS. 22A and 22B, the curing degree after a curing process of the display-region curable-resin part 4c cures may be equal to the curing degree after a curing process of the inner curable-resin part 4b.

Figure 23A:
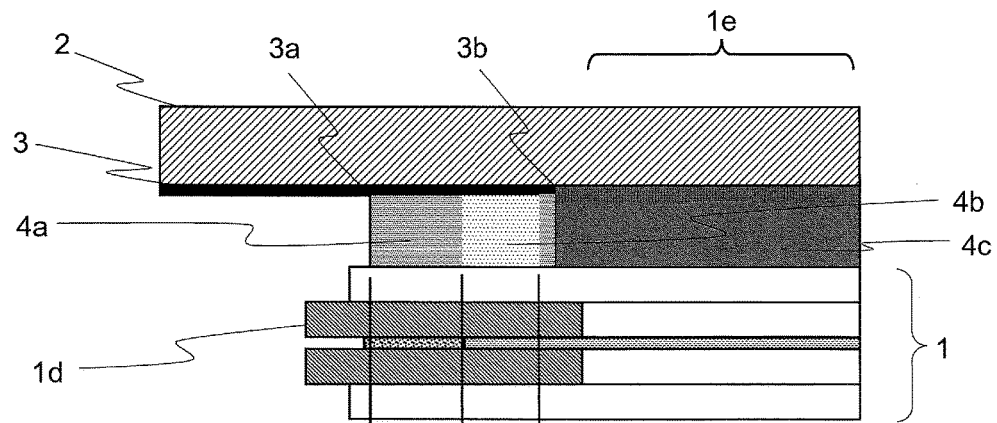
FIG. 23A and FIG. 23B depict a plan view and a half sectional view illustrating another example of a display apparatus (having a structure that UV rays, which once cured the curable resin in the display region, further entered an area below the light-shielding member to cure the curable resin in the area) of Example 4 and a graph of the curing degree.
Figure 23B:
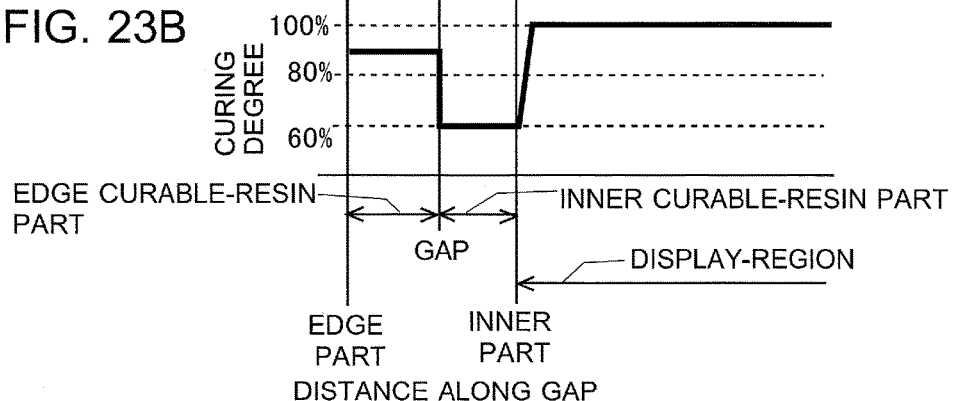
Figure 24:
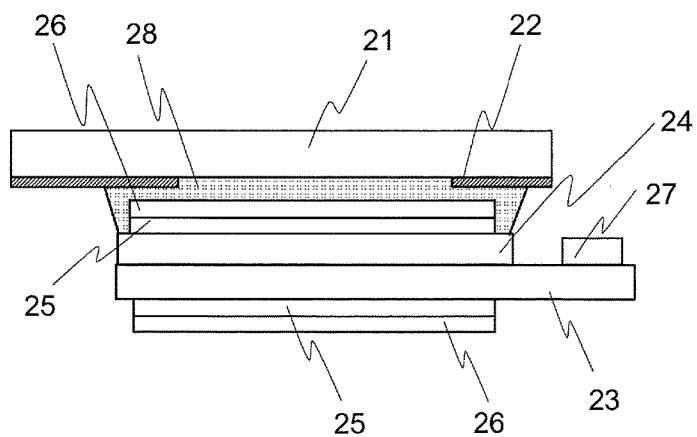
FIG. 24 depicts a diagram illustrating a conventional display apparatus (WO2007/066590)
Figure 25:
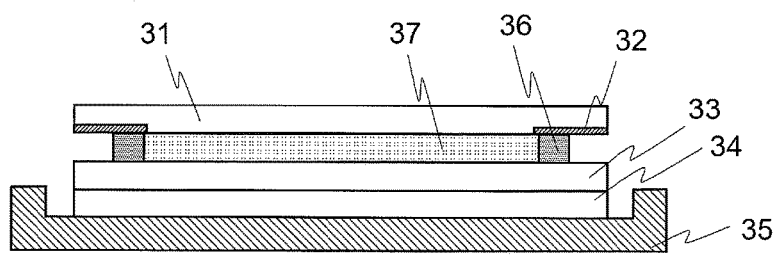
FIG. 25 depicts a diagram illustrating a conventional display apparatus (JP-A No. 2013-088455).

As shown in FIGS. 23A and 23B, the display-region curable-resin part 4c below the display region 1e may be cured with UV rays such that the curable resin 4 below the light-shielding member 3 is cured to partly have a high curing degree, which can provide the same effect as the structure shown in FIGS. 21A and 21B.

As described above, this example has an advantageous effect that the separation of the cover plate 2 and the base hardly occurs due to external force 11 and the display defects hardly occur due to external force 11 in the pressing direction in comparison with Example 1.

It should be noted that the present invention is not limited to the above-described embodiments and examples. For example, Example 3 can be applied to any example described in Example 1 and Example 2. In addition, Example 4 can be applied to and combined with any example that uses an image display unit for the base among Examples 1 to 3. Furthermore, with respect to the base, the cover plate 2 and curable resin 4, elements exemplified in Examples 1 can be combined freely to apply to Examples 2 to 4.

The invention claimed is:
1. An apparatus comprising:
   a plate-shaped base;
   a cover plate;
   a curable resin located in a gap between the plate-shaped base and the cover plate and adhering the plate-shaped base and the cover plate together; and
   a light-shielding member located on a peripheral part of at least one of the plate-shaped base and the cover plate,
   wherein the curable resin includes a first curable-resin part, a second curable-resin part, and a third curable-resin part,
   the first curable-resin part, the second curable-resin part, and the third curable-resin part are arranged from an outside of the apparatus toward an inside of the apparatus,
   the first curable-resin part contacts the second curable-resin part,
   the second curable-resin part contacts the third curable-resin part,
   the first curable-resin part and the second curable-resin part are shielded by the light-shielding member, the third curable-resin part is not shielded by the light-shielding member, the second curable-resin part is lower in one of an elastic modulus, and an adhesion strength than the first curable-resin part, and the third curable-resin part is higher or a substantially same in one of an elastic modulus, and an adhesion strength, in comparison with the first curable-resin part.

2. The apparatus of claim 1,
wherein the one of an elastic modulus, a curing degree, and an adhesion strength of the first and second curable-resin parts decreases continuously from the outer edge of the light-shielding member to the inner edge of the light-shielding member.

3. The apparatus of claim 1,
wherein the elastic modulus of the second curable-resin part is equal to 5 KPa or less.

4. The apparatus of claim 1,
wherein the second curable-resin part has a curing degree of about 60%, and the first curable-resin part has a curing degree equal to 80% or more.

5. The apparatus of claim 1,
wherein the curable resin has at least one of photo-curability, heat-curability, and moisture-curability.

6. The apparatus of claim 1,
wherein the gap is filled with the curable resin up to the end of the plate-shaped base.

7. The apparatus of claim 1, further comprising a gap-forming member located in the gap between the plate-shaped base and the cover plate.

8. The apparatus of claim 7,
wherein the gap-forming member is located at a position between the outer edge and the inner edge of the area in the gap, which is shielded by the light-shielding member, to separate the first curable-resin part and the second curable-resin part from each other.

9. The apparatus of claim 1,
wherein the plate-shaped base includes an image display unit or an input unit.

10. The apparatus of claim 9,
wherein the plate-shaped base includes an image display unit,
the image display unit includes substrates facing each other, a seal joining the substrates together, and liquid crystal sealed within a space inside the seal,
the second curable-resin part is located in the gap to cover an area from the inner edge of the light-shielding member to an inner edge of the seal, and
the first curable-resin part is located in the gap to cover an area from the inner edge of the seal to the outer edge of the light-shielding member.

11. The apparatus of claim 1,
wherein the cover plate includes an input unit, a substrate, or a composite substrate.

12. The apparatus of claim 1,
wherein the second curable-resin part is interposed between the first curable-resin part and the third curable-resin part.

13. The apparatus of claim 12,
wherein the first curable-resin part includes an end of the curable resin.

14. The apparatus of claim 1,
wherein the light-shielding member has a uniform property over a whole region of the light-shielding member.

15. The apparatus of claim 1,
wherein a curing degree changes step-wise between the first curable-resin part and the second curable-resin part.

* * * * *